(12) United States Patent
Wang

(10) Patent No.: US 11,498,733 B2
(45) Date of Patent: Nov. 15, 2022

(54) APPARATUS AND METHODS FOR APPLYING REUSABLE WRAPPING DEVICE ON PALLETIZED MATERIALS

(71) Applicant: Hualong Wang, Apex, NC (US)

(72) Inventor: Hualong Wang, Apex, NC (US)

( * ) Notice: Subject to any disclaimer, the term of this patent is extended or adjusted under 35 U.S.C. 154(b) by 363 days.

(21) Appl. No.: 16/738,281

(22) Filed: Jan. 9, 2020

(65) Prior Publication Data

US 2021/0214137 A1 Jul. 15, 2021

(51) Int. Cl.
*B65B 13/02* (2006.01)
*B65D 71/04* (2006.01)
*B65D 71/00* (2006.01)

(52) U.S. Cl.
CPC .............. *B65D 71/04* (2013.01); *B65B 13/02* (2013.01); *B65D 71/0088* (2013.01); *B65D 2571/00117* (2013.01)

(58) Field of Classification Search
CPC .... B65B 13/02; B65D 71/04; B65D 71/0096; B65D 71/0088
USPC .......................................................... 53/399
See application file for complete search history.

(56) References Cited

U.S. PATENT DOCUMENTS

| | | |
|---|---|---|
| 2,455,237 A | 11/1948 | Davis |
| 4,738,371 A | 4/1988 | Wakeman |
| 4,876,841 A | 10/1989 | Jensen |
| 5,226,524 A | 7/1993 | Guttinger et al. |
| 6,099,221 A | 8/2000 | Takagi |
| 6,224,260 B1 | 5/2001 | Nickell et al. |
| 6,948,896 B2 | 9/2005 | Zhan et al. |
| 6,984,431 B2 | 1/2006 | Mass et al. |
| 7,934,894 B1 | 5/2011 | Temple |
| 8,302,267 B2 | 11/2012 | Morikawa et al. |
| 9,162,805 B1 | 10/2015 | Testa et al. |
| 9,333,978 B2 | 5/2016 | Lato et al. |
| 9,540,139 B2 | 1/2017 | Baltz |
| 9,574,289 B2 | 2/2017 | Lieber et al. |
| 10,208,409 B2 | 2/2019 | Lieber et al. |
| 10,336,520 B2 | 7/2019 | Popp |
| 2014/0356091 A1* | 12/2014 | Lato ...................... B62B 5/0013 410/97 |
| 2016/0251155 A1* | 9/2016 | Lato ................... B65D 71/0096 410/98 |

FOREIGN PATENT DOCUMENTS

CN 203997427 U 12/2014

* cited by examiner

*Primary Examiner* — Chinyere J Rushing-Tucker
(74) *Attorney, Agent, or Firm* — NZ Carr Law Office

(57) ABSTRACT

Embodiments of the present disclosure generally relate to apparatus and methods for applying reusable wrapping device on goods to be transported on a transportation carrier, such as a pallet. More particularly, embodiments of the present disclosure relate to a cart and wrapping device holder assembly for applying reusable pallet wrapping devices over palletized materials.

18 Claims, 23 Drawing Sheets

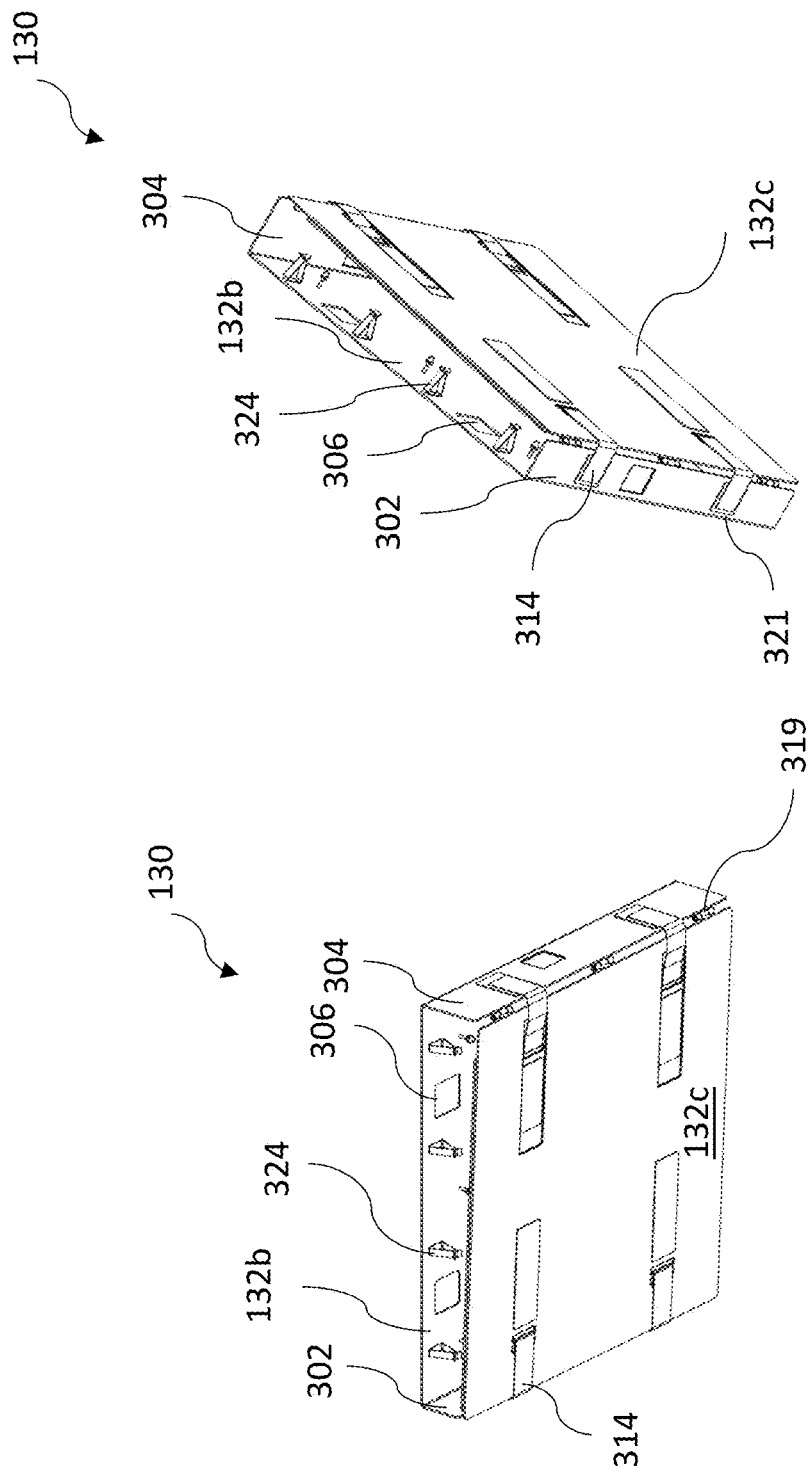

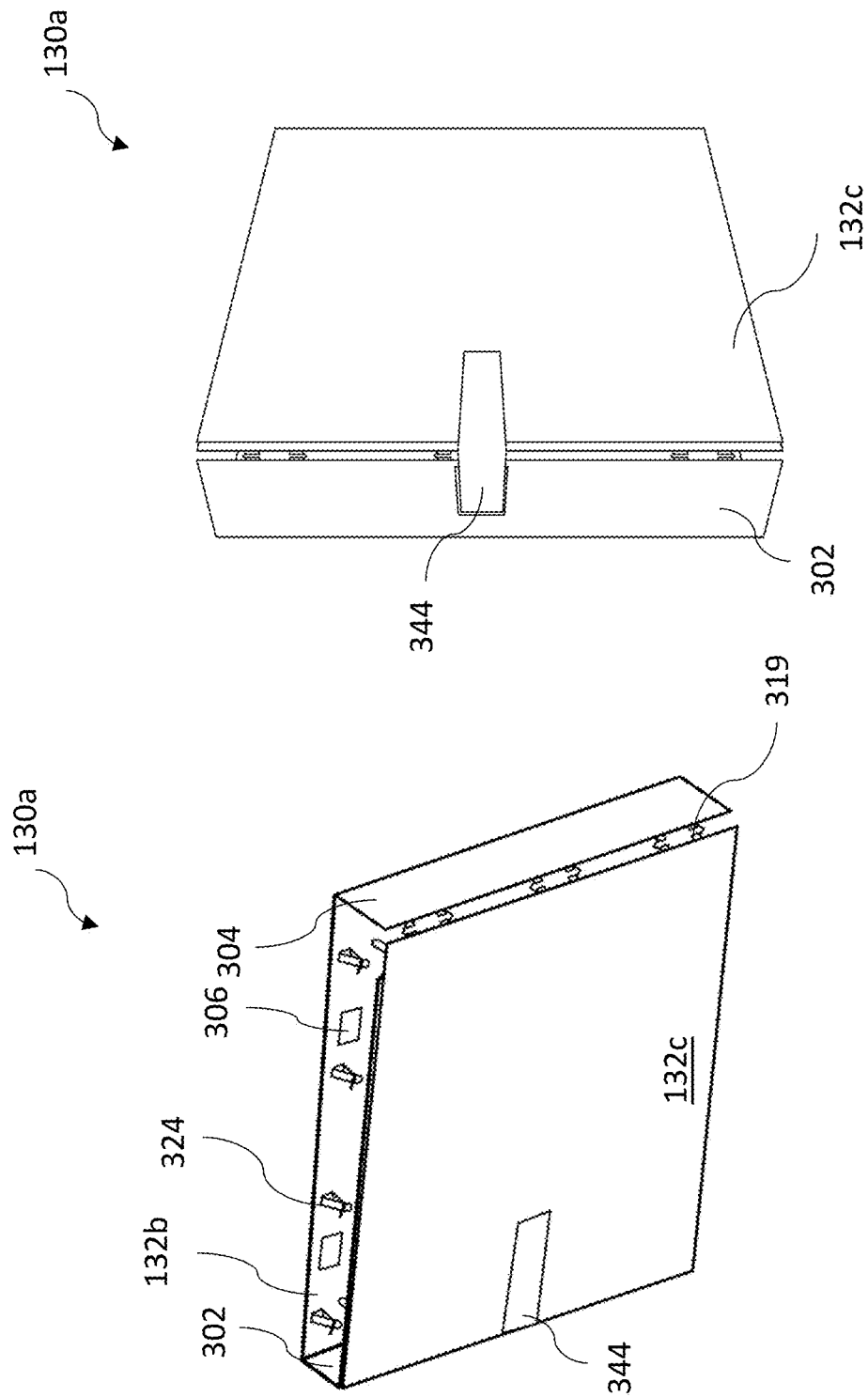

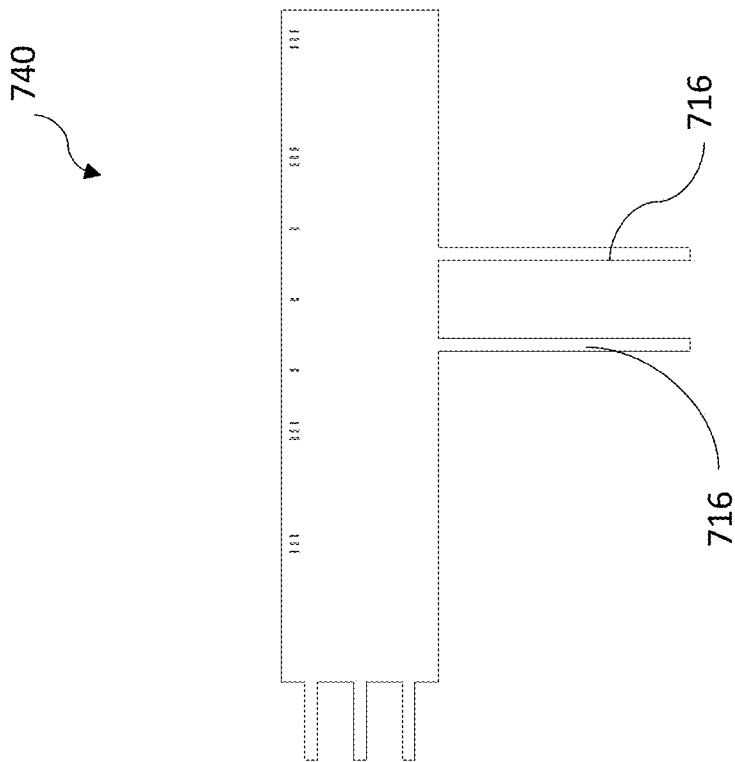
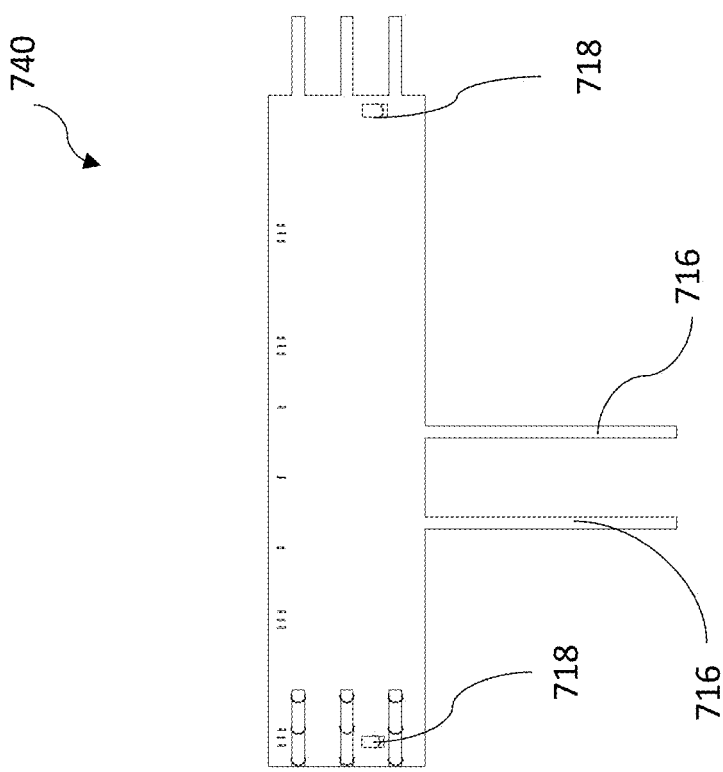
Fig. 7A
Fig. 7B

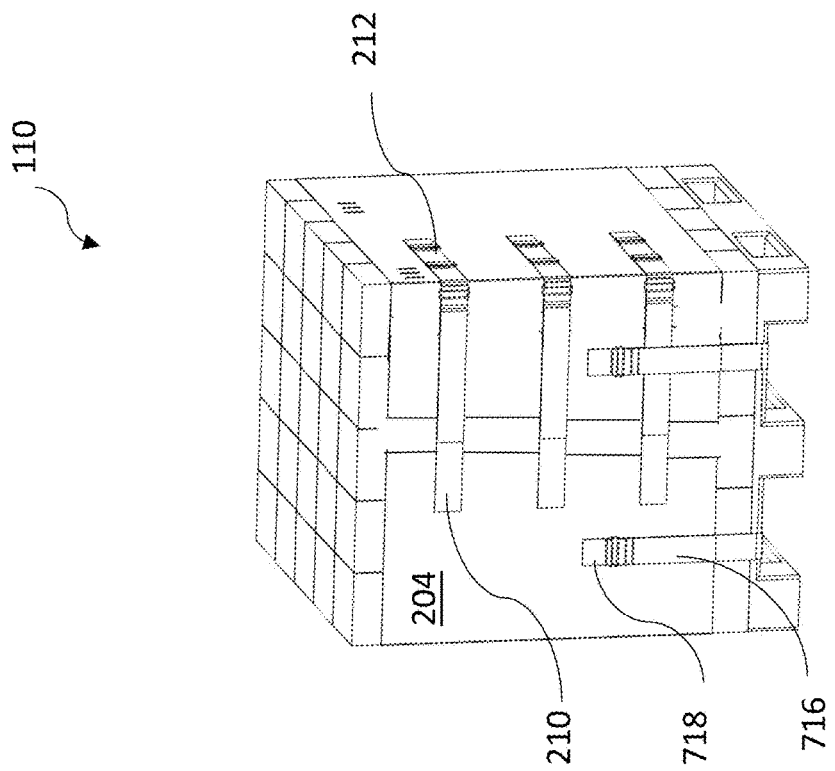
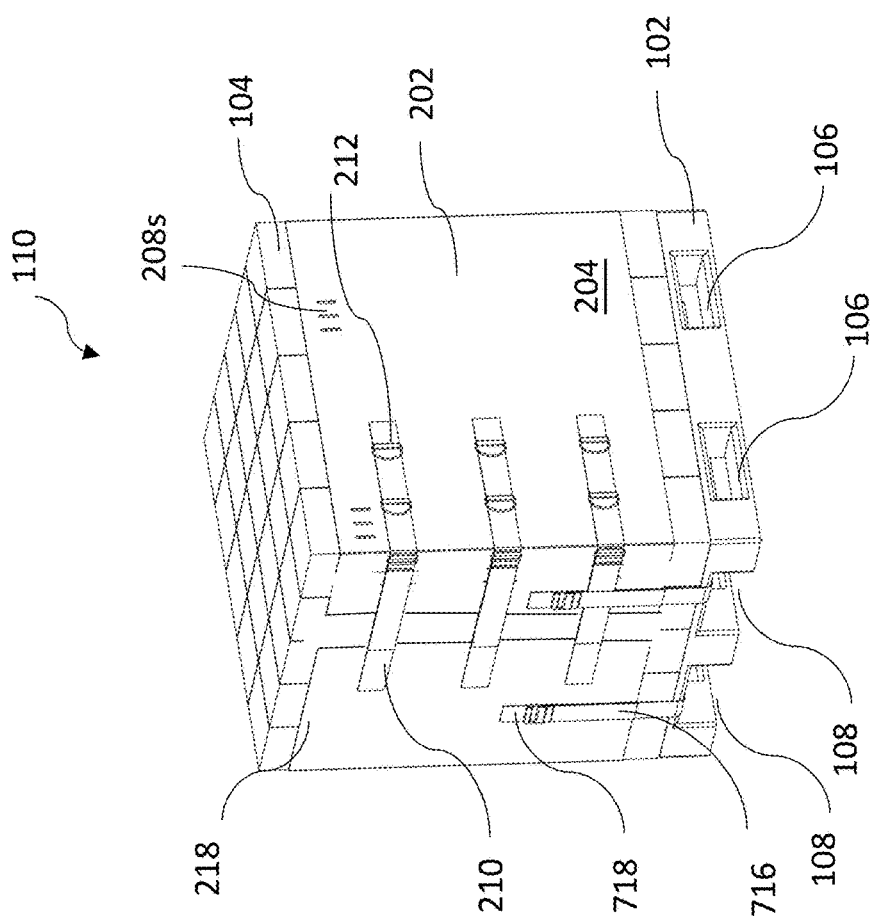
Fig. 7D
Fig. 7C

APPARATUS AND METHODS FOR APPLYING REUSABLE WRAPPING DEVICE ON PALLETIZED MATERIALS

BACKGROUND

Field

Embodiments of the present disclosure generally relate to apparatus and methods for applying reusable wrapping device on goods to be transported on a transportation carrier, such as a pallet. More particularly, embodiments of the present disclosure relate to carts and holders for applying reusable pallet wrapping devices over palletized materials.

Description of the Related Art

Transportation carriers such as pallets are commonly used in the industry for moving loads for shipment. Various articles or containers are stacked on pallets to be moved from one place to another using a forklift or other mechanical device. Reusable wrapping devices have been used in recent years to replace traditional plastic one-time wrapping.

Applying reusable wrapping devices is traditionally performed manually. Applying reusable typically involves in positioning the wrapping device relative to the pallet and then applying multiple fasteners. However, it is tedious to position the wrapping device and sometimes challenging to maintain the position of the wrapping device while fastening fasteners. As a result, applying reusable wrapping devices over the pallets may take longer and need more manpower.

Therefore, there exists a need for improved apparatus and methods for applying reusable wrappings over a palletized load.

SUMMARY

Embodiments of the present disclosure generally relate to apparatus and methods for applying reusable wrapping device on goods to be transported on a transportation carrier, such as a pallet. More particularly, embodiments of the present disclosure relate to carts and holders for applying reusable pallet wrapping devices over palletized materials.

Embodiments of the present disclosure provide an apparatus for applying reusable wrapping devices. The apparatus comprises a cart including two lower arms for inserting to openings of a pallet block, and adaptors for hanging a reusable wrapping device on the cart.

Some embodiments of the present disclosure provide a wrapping device holder comprising a first panel having a first end and a second end, a second panel foldably attached to the first end of the first panel, a third panel foldably attached to the second end of the first panel, and a plurality of pegs positioned on the first, second, and third panels for hanging a wrap body of a wrapping devices.

Some embodiments of the present disclosure provide a method for applying a reusable wrapping device. The method comprises hanging a wrapping device on a cart, wherein the cart includes two lower arms adapted to enter openings in a pallet block, moving the cart relative to a pallet load to insert lower arms of the cart into openings a pallet block of the pallet load, and pulling straps of the wrapping device on the cart to apply the wrapping device on the pallet load.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIG. 3A-3G are schematic perspective views of a wrapping device holder according to embodiments of the present disclosure.

FIG. 3H-3I are schematic perspective views of a wrapping device holder according to another embodiment of the present disclosure.

FIGS. 7A-7B are schematic plan views of a wrapping device according to the present disclosure.

FIGS. 7C-7D are schematic perspective views of a pallet load secured with the wrapping device of FIGS. 7A-7B.

Figure 1A:
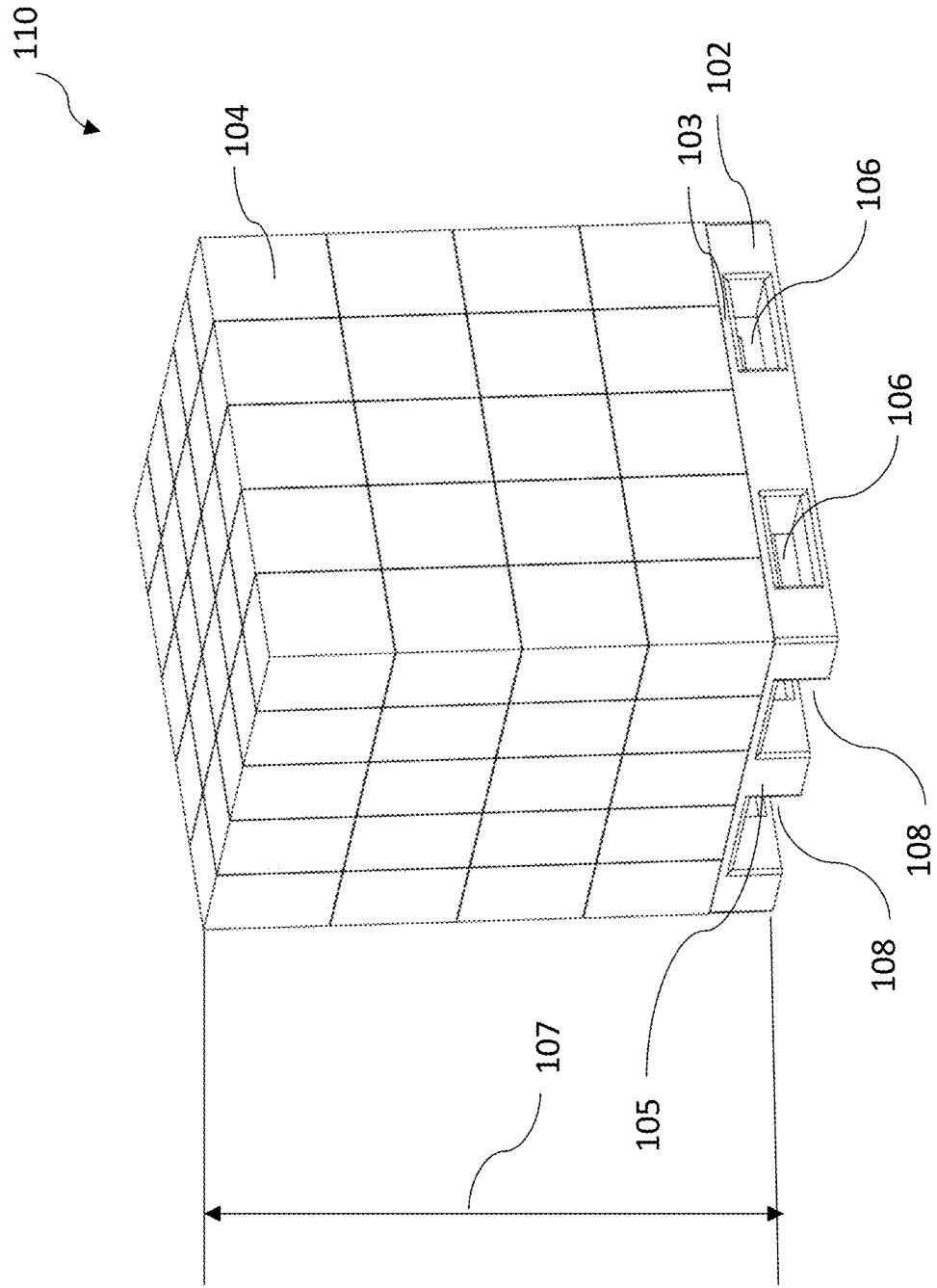
FIG. 1A is a schematic perspective view of a pallet load.

To facilitate understanding, identical reference numerals have been used, where possible, to designate identical elements that are common to the figures. It is contemplated that elements and features of one implementation may be beneficially incorporated in other implementations without further recitation. It is to be noted, however, that the appended drawings illustrate only exemplary implementations of this disclosure and are therefore not to be considered limiting of its scope, for the disclosure may admit to other equally effective implementations.

DETAILED DESCRIPTION

The following disclosure describes a wrapping device for securing goods on a transportation carrier such as a pallet. Details are set forth in the following description and in FIGS. 1-7 to provide a thorough understanding of various implementations of the disclosure. Many of the details, dimensions, angles and other features shown in the Figures are merely illustrative of particular implementations. Accordingly, other implementations can have other details, components, dimensions, angles and features without departing from the spirit or scope of the present disclosure.

In addition, further implementations of the disclosure can be practiced without several of the details described below.

Embodiments of the present disclosure generally relate to apparatus and methods for applying reusable wrapping device on goods to be transported on a transportation carrier, such as a pallet. More particularly, embodiments of the present disclosure relate to a cart and wrapping device holder assembly for applying reusable pallet wrapping devices over palletized materials.

The cart and wrapping device holder assembly includes a cart for interacting with pallet loads, and a wrapping device holder that can be removably attached to the cart. In some embodiments, the wrapping device holder is configured to hold a plurality pallet wrapping device. When attached to the cart, the wrapping device holder can position the wrapping device relative to the pallet load to allow easy application of the wrapping device around the pallet loads. The wrapping device holder may also be used to store and transfer the wrapping devices.

FIG. 1A is a schematic perspective view of a pallet load 110. The pallet load 110 includes a pallet block 102 for supporting material to be transferred and a load 104 including material to be transferred. The load 104 may include one or more multiple packages stacked together in a substantially column form.

The pallet block 102 has a top board 103 for supporting the load 104 and columns 105 below the top board 103. The columns 105 form openings 106, 108 below the top board 103 so that forklifts can come under the pallet load 110 to pick the pallet load 110. As shown in FIG. 1A, the openings 108 may be wheel openings that allow wheeled equipment to enter.

The top board 103 of the pallet block 102 typically comes in standardized sizes. For example, the top board 103 may be 42 inches by 42 inches, or 48 inches by 48 inches, 42 inches by 48 inches. Height 107 of the pallet load 110 may vary according to needs.

Figure 1B:
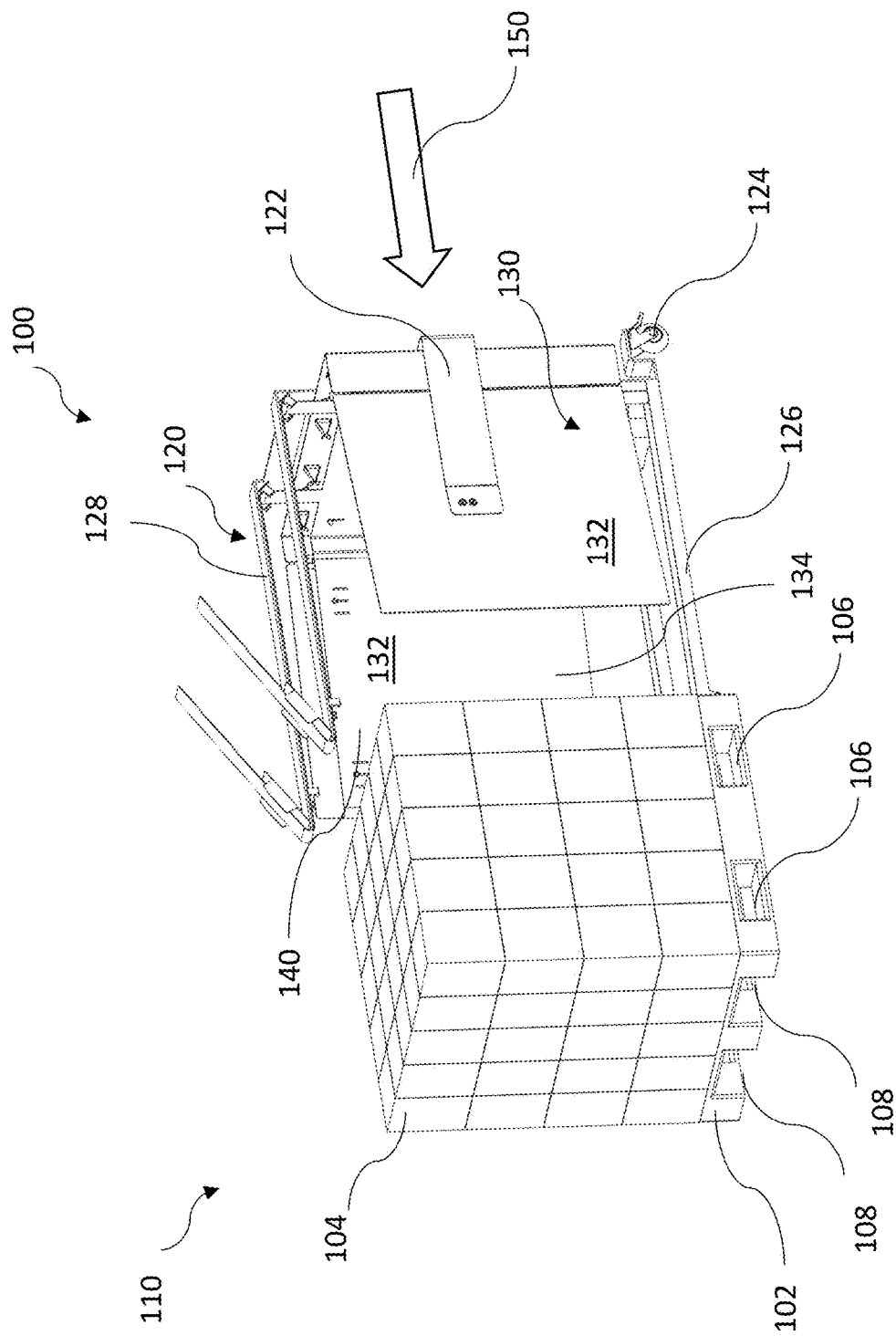
FIG. 1B is a schematic perspective view of an apparatus for wrapping a pallet load according to embodiments of the present disclosure.

FIG. 1B is a schematic perspective view of a cart and wrapping device holder assembly 100 for wrapping pallet loads according to embodiments of the present disclosure. The cart and wrapping device holder assembly 100 includes a cart 120 and a wrapping device holder 130. In some embodiments, the wrapping device holder 130 is removably attached to the cart 120. In other embodiments, the cart 120 and the wrapping device holder 130 may be permanently attached to each other.

The wrapping device holder 130 is configured to hold and support one or more wrapping devices 140. In some embodiments, a plurality of wrapping devices 140 may be stacked together in the wrapping device holder 130. The wrapping device holder 130 may include panels 132 that may be folded during storage and opened applying to wrapping devices 140 to pallet loads. As shown in FIG. 1B, the panels 132 of the wrapping device holder 130 open up to hold the wrapping devices 140 in a position of wrapping around an inner volume 134 shaped to receive a pallet load therein.

The cart 120 includes a frame 122 for receiving the wrapping device holder 130. In some embodiments, the cart 120 also includes wheels 124. The frame 122 are set on the wheels 124 so that the cart 120 can be easily moved. In some embodiments, the cart 120 includes lower arms 126. The position and dimension of the lower arms 126 are similar to forks on a forklift configured to pick up pallet loads. During operation, the lower arms 126 may be inserted in openings 108 or 106 under the top board 103 of the pallet load 110 through the openings 108 or 106. In some embodiments, the cart 120 further includes upper arms 128, which is substantially parallel to the lower arms 126. When the lower arms 126 are inserted under the pallet block 102, the upper arms 128 are positioned over the pallet load 110.

As shown in FIG. 1B, during operation, the lower arms 126 of the cart and wrapping device holder assembly 100 may be aligned with the openings 108 of the pallet load 110. The cart and wrapping device holder assembly 100 may then move along the direction 150 to insert the lower arm 126 under the pallet load 110 to position the pallet load 110 with in the inner volume 134. The pallet load 110 is then in a position of being loosely wrapped by the wrapping device 140 in the wrapping device holder 130. The wrapping device 140 may be pulled off the wrapping device holder 130 and secured to the pallet load 110 to complete the application. After the pallet load 110 is wrapped by the wrapping device 140, the cart and wrapping device holder assembly 100 may be rolled away from the pallet load 110. The cart and wrapping device holder assembly 100 may be moved to align with other pallet load to repeat the process.

Exemplary embodiments of the wrapping device 140, the wrapping device holder 130, and the cart 120 are described in detail below in association with FIGS. 2A-2D, FIGS. 3A-3G, and FIGS. 4A-4B respectively.

Figures 2A, 2B:
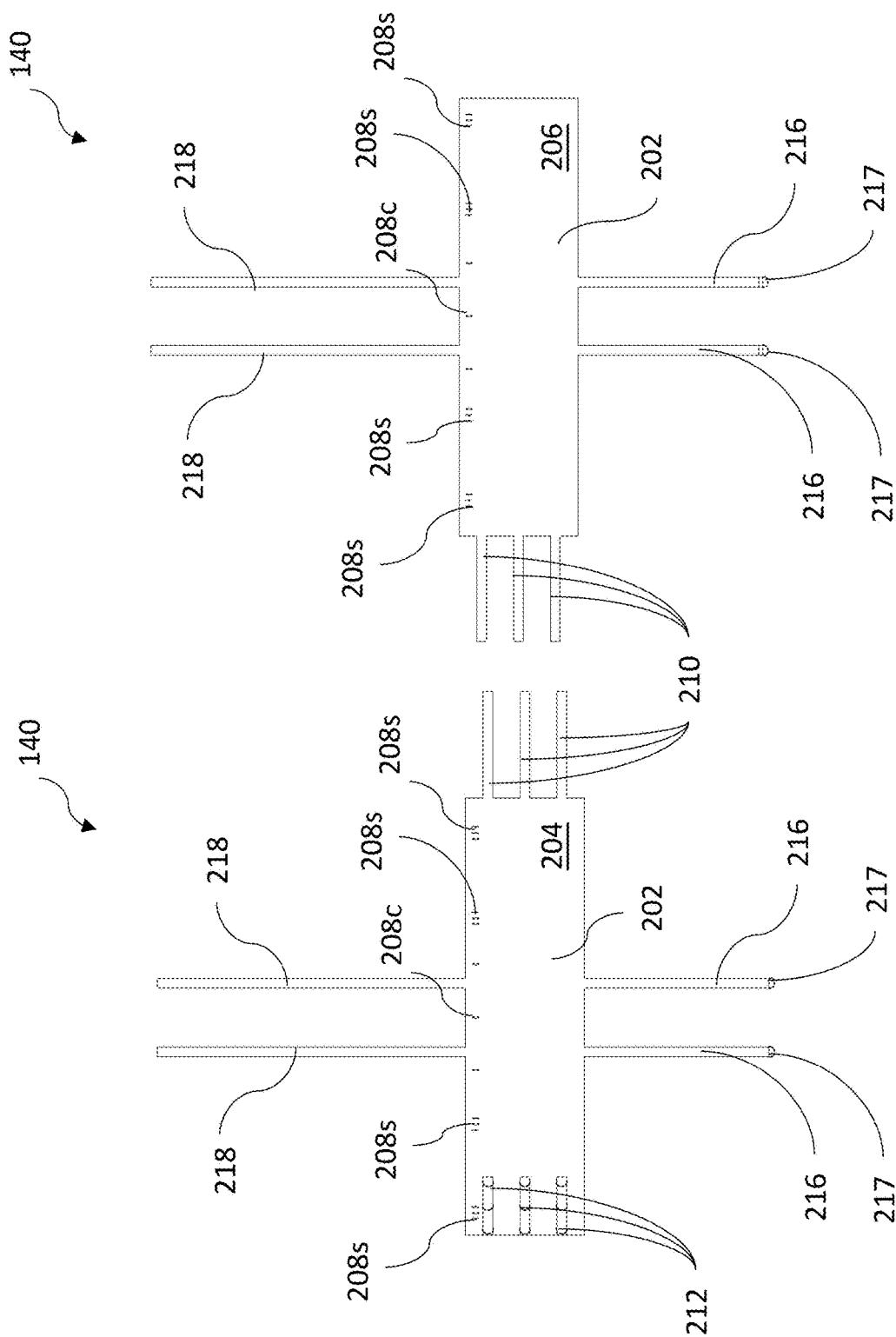
FIGS. 2A-2B are schematic plan views of a wrapping device according to the present disclosure.
Figure 2D:
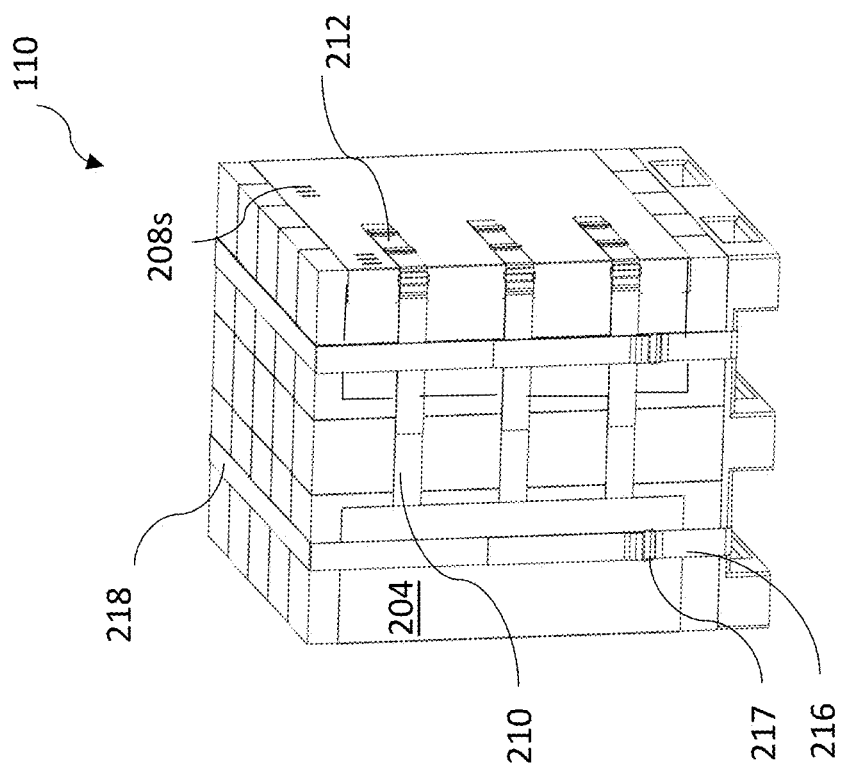
FIGS. 2C-2D are schematic perspective views of a pallet load secured with the wrapping device shown in FIGS. 2A-2B.
Figure 2C:
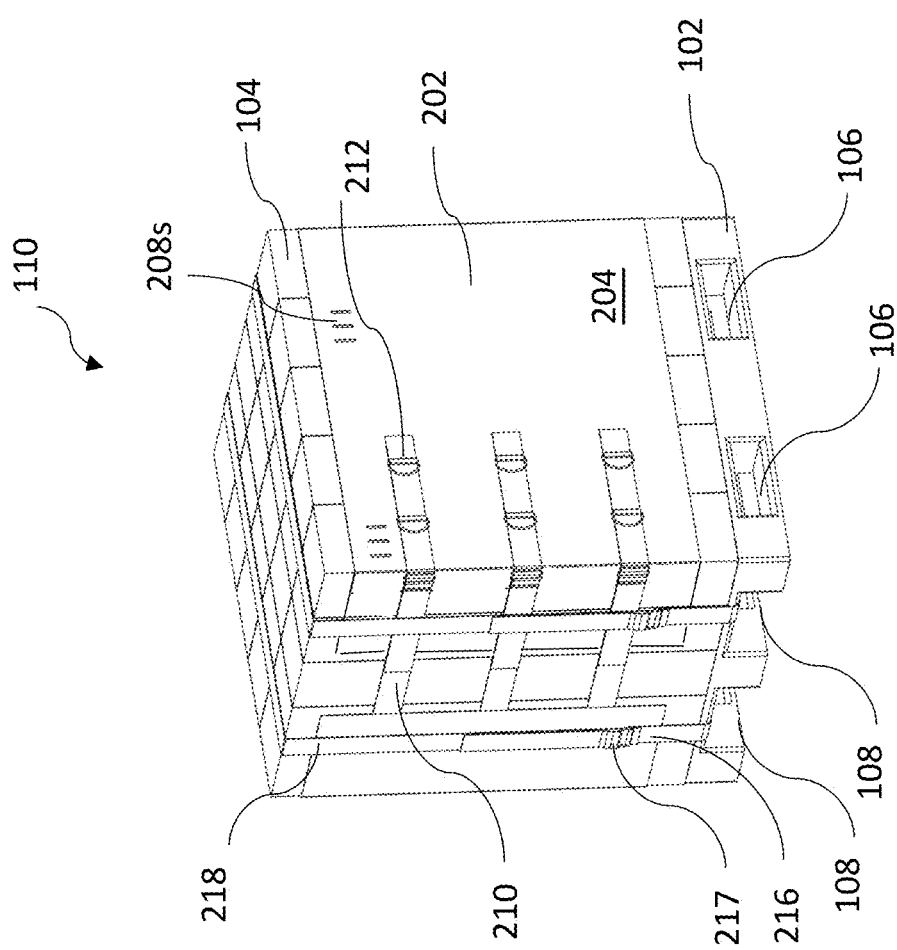

FIGS. 2A-2B are schematic plan views of the wrapping device 140 according to the present disclosure. FIGS. 2C-2D are schematic perspective views of with the wrapping device 140 shown in FIGS. 2A-2B applied over the pallet load 110.

The wrapping device 140 generally includes a flexible wrap body 202. The flexible wrap body 202 includes an outer side 204 and an inner side 206. When applied on a pallet load, the inner side 206 is facing the pallet load. In some embodiments, the wrapping device 140 includes one or more horizontal straps 210 extending from one end of the flexible wrap body 202.

The wrap body 202 is generally rectangular in shape and sized to circumvent or encircle most of the goods on a transportation carrier, such as a pallet. The wrap body 202 may use other shape, e.g., square, trapezoid, or polygons, so long as the wrapping device 140 can wrap around the goods and the pallet and prevent the goods from unwanted movement or shifting during transportation.

One or more horizontal buckle groups 212 are attached to the wrap body 202 on the opposite end of the flexible wrap body 202. Each horizontal buckle group 212 includes two or more buckles which can be fastened with a strap. Two or more buckles allow the wrapping device 140 to fit with pallet loads of different dimensions. When wrapped around a pallet, each of the horizontal straps 210 is fastened to a buckle in the corresponding horizontal buckle group 212. The wrap body 202 can be a solid sheet of cloth (e.g., non-mesh plastic cloth) that is flexible and transparent, if desired.

In some embodiments, the wrapping device 140 further includes one or more upper straps 218 extending from an upper side of the wrap body 202, and one or more lower straps 216 extending from a lower side of the wrap body 202. The upper straps 218 are configured to fasten with the corresponding lower straps 216 when wrapped around a pallet load. In some embodiments, a buckle 217 is attached to each of the lower straps 216, and the upper strap 218 is configured to fasten to the buckle 217.

Each of the straps 210, 216, 218 may be a strip of cloth, leather, fabric or any suitable flexible material such as polyester, nylon, polypropylene, polyethylene, canvas, composite woven, any suitable natural or synthetic materials, or any combination thereof. In some embodiments, each of the straps 210, 218 may include a hook-and-loop type fastener having a hook part and a loop part. In some embodiments, each of the straps 210, 218 may further include a holding part configured for ease of grasping by a human operator during the operation.

In some embodiments, the wrap body 202 may include a plurality of slits 208s, 208c formed along the upper end. The slits 208s, 208c are configured to receive pegs on the wrapping device holder 130 therefore allowing the wrap body 202 to hang in the wrapping device holder 130. The slits 208c are formed within a middle section of the wrap body 202. The slits 208s are formed within side sections of the wrap body 202. In some embodiment, the slits 208s on the side sections may be formed in a group of multiple adjacent slits to provide alignment tolerance with the wrapping device holder 130.

Figures 3A, 3B:
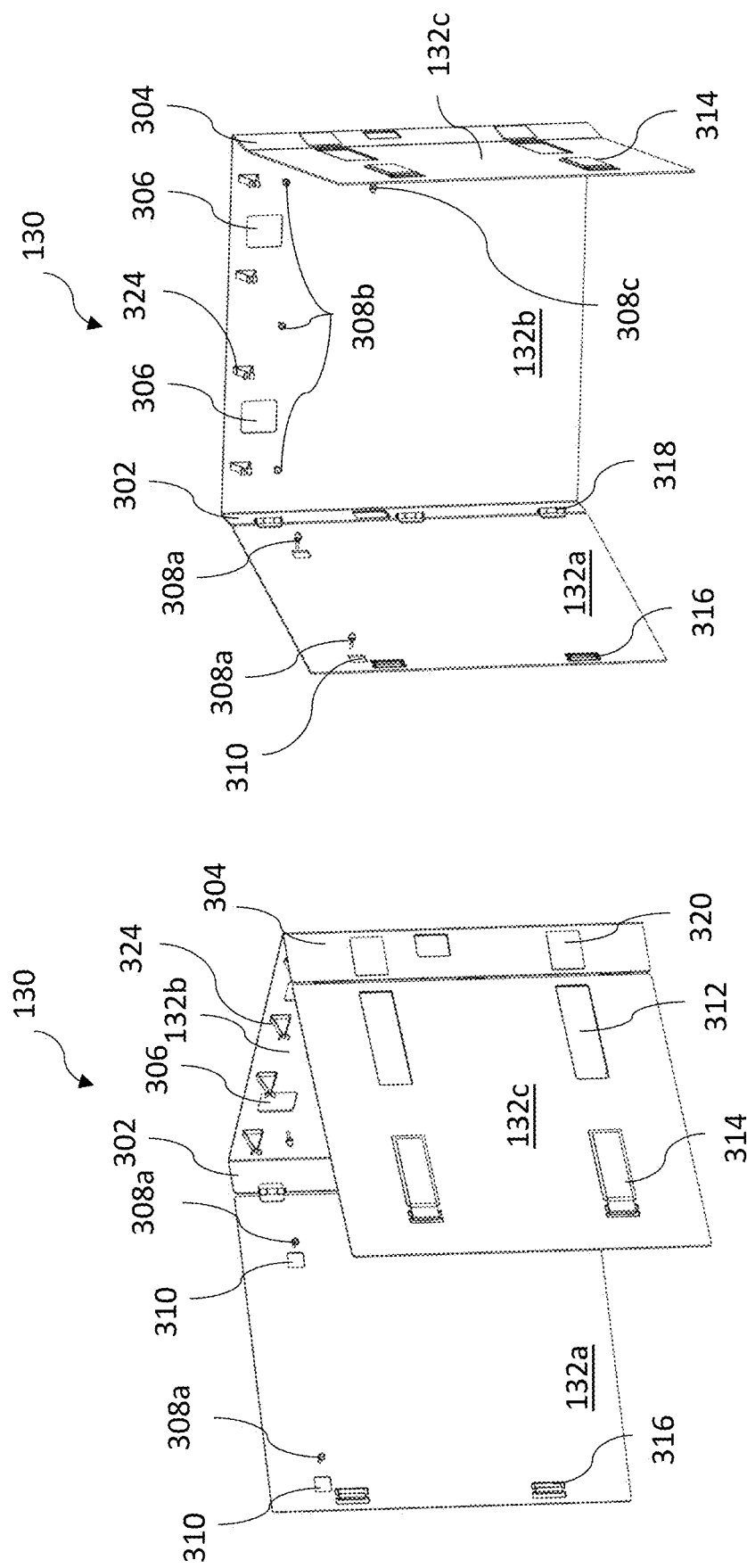
Figure 3D:
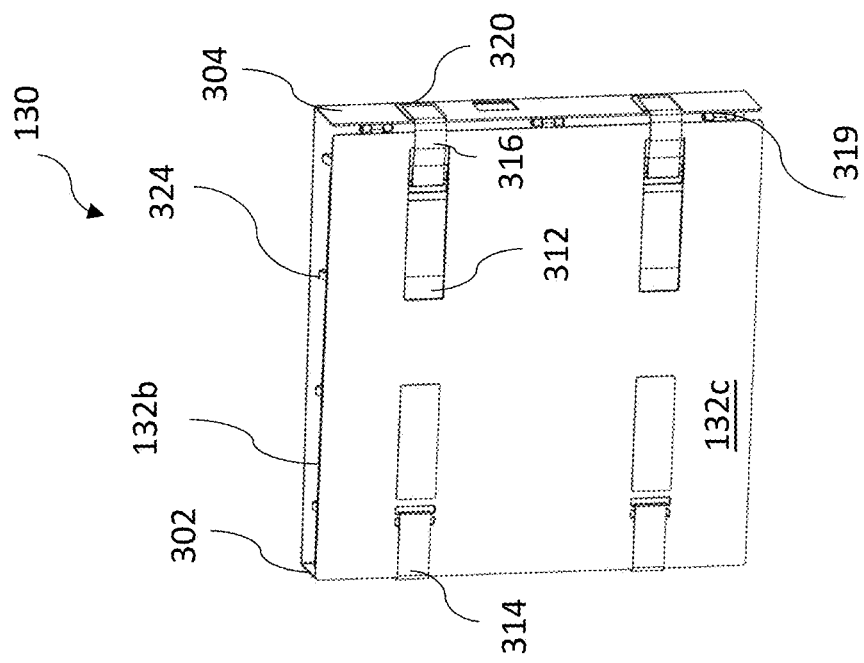
Figure 3C:
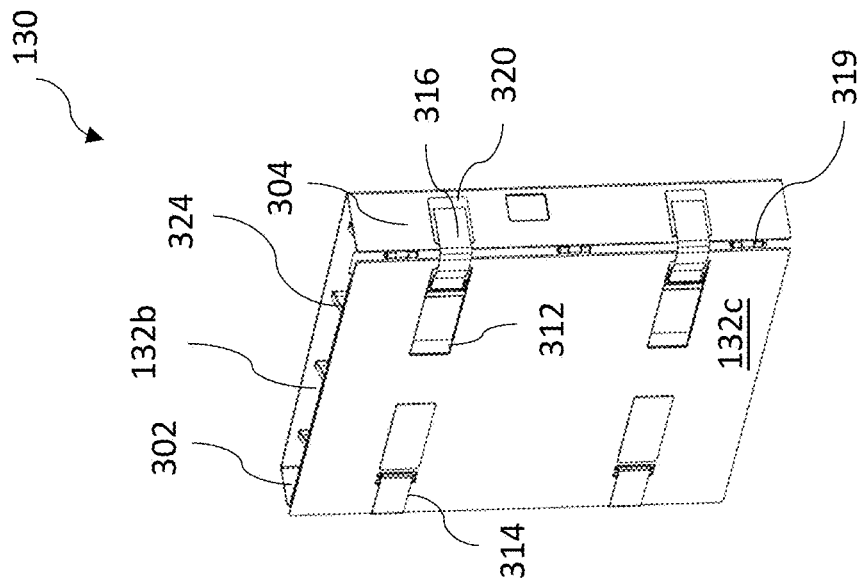
Figure 3G:
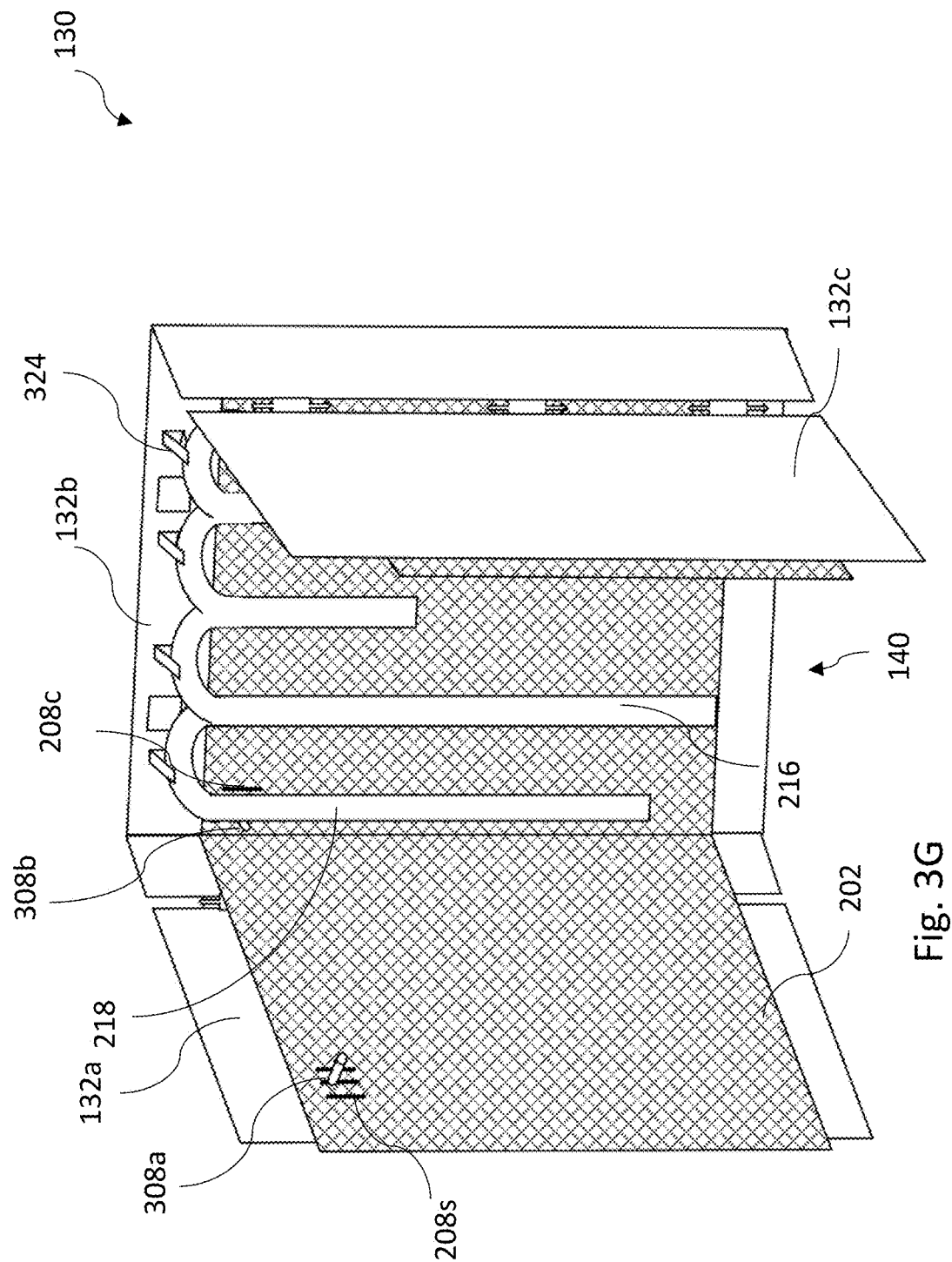

FIG. 3A-3G are schematic perspective views of the wrapping device holder 130 according to embodiments of the present disclosure. FIGS. 3A and 3B are schematic perspective views of the wrapping device holder 130 in an open position. FIGS. 3C-3F are perspective views of the wrapping device holder 130 in folded position. FIG. 3G is a perspective view of the wrapping device holder 130 with a wrapping device stored therein.

The wrapping device holder 130 may include panels 132a, 132b, 132c foldably connected together. The panels 132a, 132b, 132c may be formed from a material with some rigidity, such as plastic, metal, cardboard, etc. In some embodiments, the panel 132a, 132c includes a magnetic part or is made from a magnetic material so that the panel 132a, 132c can be magnetically fixed to the cart 120.

In some embodiments, the middle panel 132b may be formed in U-shape having two end sections 302, 304. The end sections 302, 304 allow the wrapping device holder 130 to be folded into a box. In some embodiments, the panel 132a is connected to the end section 302 by hinges 318, and the panel 132c is connected to the end section 304 by hinges 319. Alternatively, other foldable connections may be used to connect the panels 132a, 132b, 132c.

In some embodiments, notches 306 are formed through the panel 132b. The notches 306 allow the wrapping device holder 130 to hang onto the cart 120. Alternatively, other removable connections, such as hooks, may be used to attach the wrapping device holder 130 to the cart 120.

In some embodiments, the wrapping device holder 130 include pegs 308a, 308b, 308c for hanging wrap body 202 of the wrapping device 140. As shown in FIG. 3G, a wrapping device 140 can be stored in the wrapping device holder 130 by hanging the wrap body 202 on the pegs 308a, 308b, 308c via slits 208s and 208c. Multiple wrapping devices 140 may be stored in the wrapping device holder 130 by stacking the wrap bodies 202 on the pegs 308a, 308b, 308c.

In some embodiments, the wrapping device holder 130 includes one or more clips 324 configured to hold straps of the wrapping devices 140 in the wrapping device holder 130. As shown in FIG. 3A, a plurality of clips 324 are positioned near an upper edge of the panel 132b.

In some embodiments, the panel 132a is configured to folded towards the panel 132b first, the panel 132c is then folded over the panel 132b. In some embodiments, the end section 304 is thicker than the end section 302 to accommodate the additional thickness of the panel 132a.

In some embodiments, openings 310 are formed through the panel 132a. The openings 310 are configured to receive pegs 308c on the panel 132c when the panel 132c is folded over the panel 132b. The openings 310 prevent the wrapping device holder 130 from getting bulky, and also function as anchor for the pegs 308c to stabilize the wrapping device holder 130 at the folded position.

In some embodiments, fastening devices 316, 314 are attached to the panels 132a, 132c for tying the panels 132a, 132c at the folded position. The fastening devices 314 are configured to fasten to fastening devices 321 on the end section 302. The fastening devices 316 are configured to fasten to fastening devices 320 on the end section 304. Openings 312 are formed through the panel 132c to allow the fastening device 316 passing through and reaching the fastening device 320. In some embodiments, the fastening devices 314/321, 316/320 may be pairs of loop and hook type fastening devices.

FIG. 3H-3I are schematic perspective views of a wrapping device holder 130a according to another embodiment of the present disclosure. The wrapping device holder 130a is similar to the wrapping device holder 130 except that the wrapping device holder 130a includes a single fasten device 344 configured to secure the panel 132c to the end section 302. The simplified fastening design in the wrapping device holder 130a can reduce cost of manufacturing and provide ease of operation.

In some embodiments, panels 132a, 132b, 132c may be replaced with frame works or formed with multiple openings to reduce weight and cost of material.

Figure 4B:
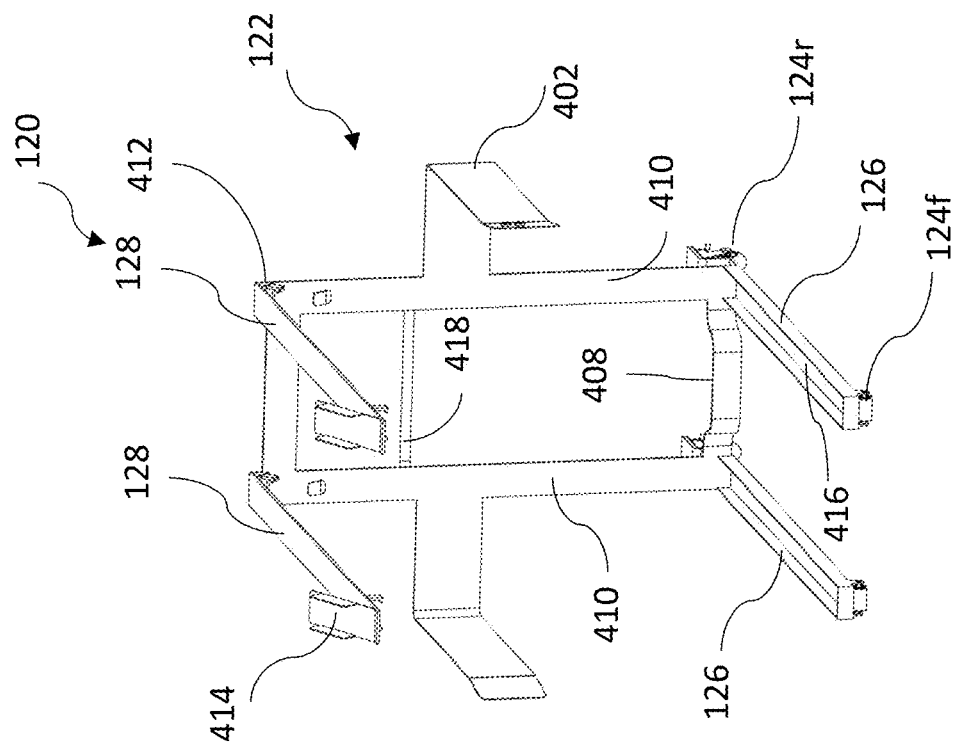
FIGS. 4A-4B are schematic perspective views of a cart for applying a wrapping device over pallet loads according to embodiments of the present disclosure.
Figure 4A:
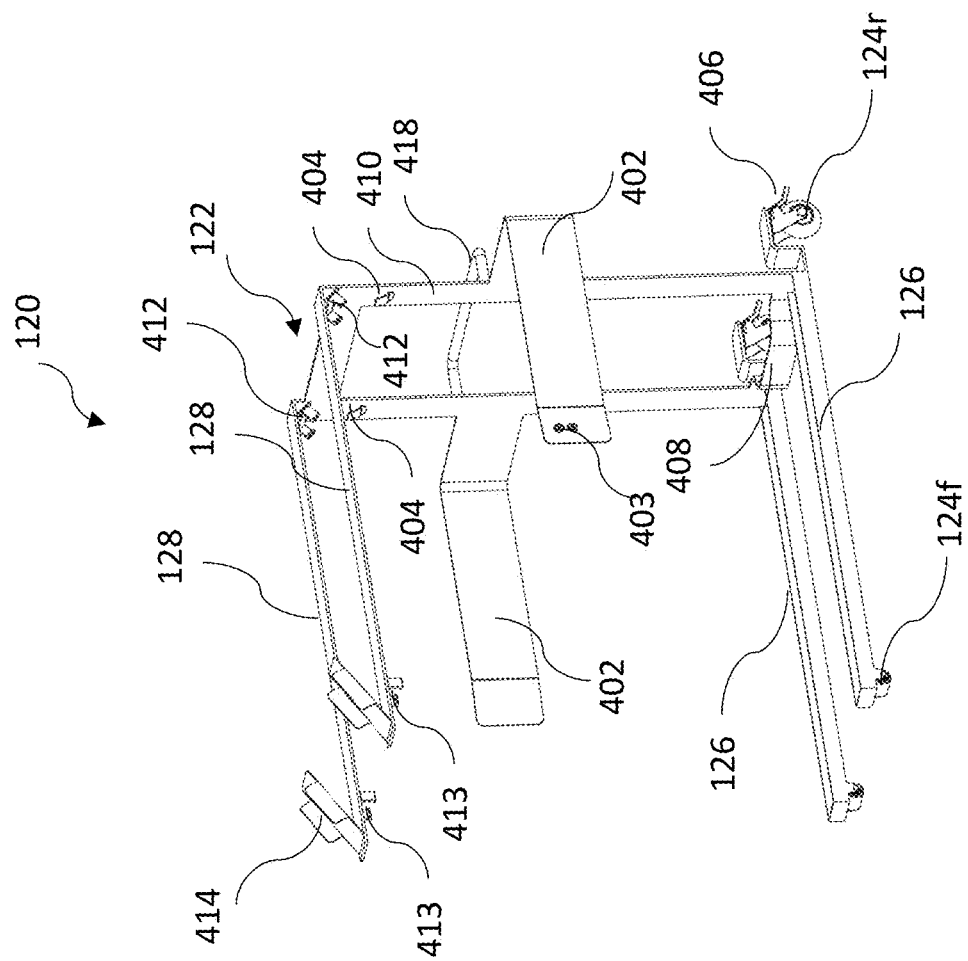

FIGS. 4A-4B are schematic perspective views of the cart 120 according to embodiments of the present disclosure. The cart 120 is configured to use with the wrapping device holder 130 for applying a wrapping device over pallet loads.

The cart 120 includes a frame 122 for receiving the wrapping device holder 130. In some embodiments, the frame 122 includes two columns 410. The lower arms 126 may extend from lower ends of the columns 410. The upper arms 128 may extend from upper ends of the columns 410. Side arms 402 may extend from a middle section of the columns 410. The side arms 402 may be configured to retain the side panels 132a, 132c of the wrapping device holder 130.

In some embodiments, each side arm 402 includes a magnetic button 403. The magnetic button 403 interacts with the panels 132a, 132c during operation to prevent the panels 132a, 132c from shifting around.

In some embodiments, the frame 122 includes a stopping bar 408. The stopping bar 408 may be positioned between the columns 410 near the lower ends The stopping bar 408 protrudes forward relative to the columns 410. During operation, the stopping bar 408 will contact the pallet block 102 before the wrapping devices on the cart 120 making contact with the pallet load.

In some embodiments, the cart 120 includes a handle bar 418 for pushing or pulling the cart 120. In some embodiments, the cart 120 moves on wheels 124. In some embodiments, the cart 120 includes two front wheels 124f installed near dismal ends of the lower arm 126 and two rear wheels 124r installed near the lower ends of the column 410. In some embodiments, the front wheels 124f are smaller than the rear wheels 126r to allow the lower arm 126 to be easily inserted under the pallet block 102. In some embodiments, a break 406 may be installed on the rear wheel 124r. The break 406 may be selectively applied to park the cart 120.

In some embodiments, the cart 120 includes adaptors 404 configured to receive and support the wrapping device holder 130. In some embodiments, the adaptors 404 may be hooks. For example, the wrapping device holder 130 may be attached to the cart 120 by hanging the wrapping device holder 130 over the adaptors 404 by the notches 306. In some embodiments, the adaptors 404 are positioned on the column 410. Alternatively, other suitable mechanisms may be used to removably attach the wrapping device holder 130 to the cart 120.

In some embodiments, the cart 120 includes strap holders 412, 413 configured to hold straps on the wrapping devices during operation. The strap holders 412, 413 may be positioned along the upper arms 128. In some embodiments, the strap holders 412 are positioned at the corner between the upper arm 128 and the column 410 while the strap holders 413 are positioned at a distal end of the upper arm 128. As shown in FIG. 4A, the strap holders 412 may be positioned at an angle relative to the upper arm 128 for easy access.

Figure 4D:
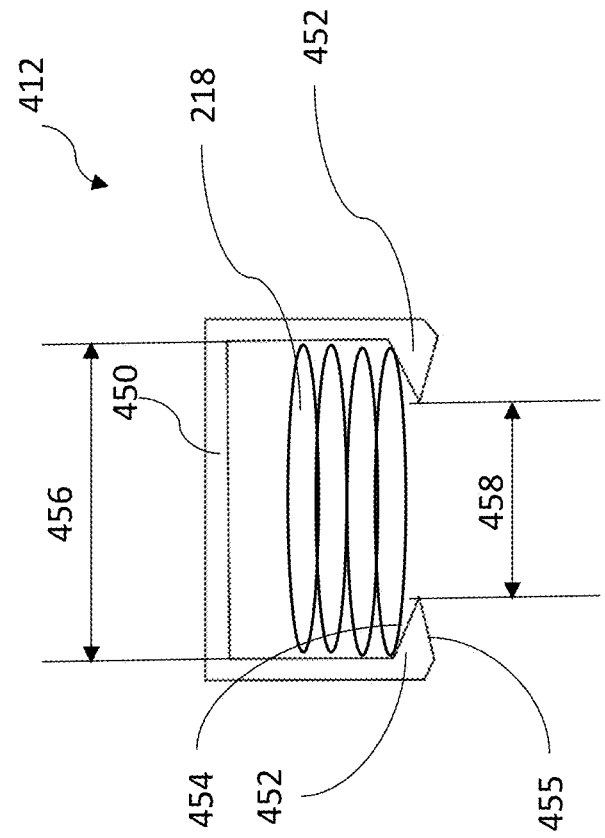
FIG. 4D is a schematic view of the strap holder of FIG. 4C.
Figure 4C:
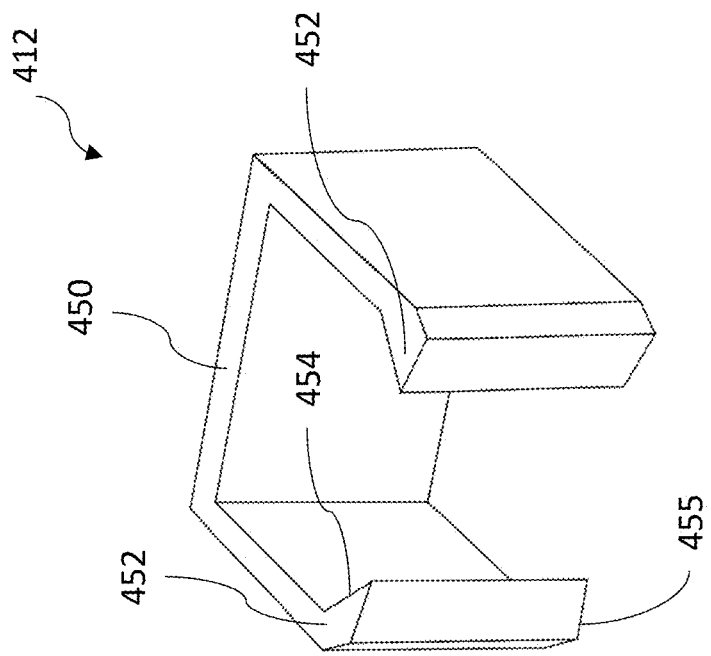
FIG. 4C is a schematic perspective view of a strap holder according to embodiments of the present disclosure.

In some embodiments, the strap holders 412, 413 have the same structure. In some embodiments, the strap holders 412, 413 include structure details to allow easy inserting and removal of the straps. FIGS. 4C-4D include one embodiments of the strap holder 412 of the present disclosure.

FIG. 4C is a schematic perspective view of the strap holder 412. FIG. 4D is a schematic view of the strap holder 412 while holding a plurality of straps 218. The strap holder 412 includes a U-shaped body 450. The U-shaped body 450 has an inner with 458. The U-shaped body 450 includes retaining ends 452 at both ends. Each retaining end 452 extends inwardly to form an opening 458. The opening 458 is narrower than the inner width 456 of the U-shaped body 450. In some embodiments, each retaining end 452 includes a sloped inner surface 454. In some embodiments, each retaining end 452 includes a sloped outer surface 455.

As shown in FIG. 4D, the strap holder 412 is configured to hold a plurality of straps, such as straps 218. The width of the straps 218 is wider than the opening 458 so that the straps 218 stay within the strap holder 412 without falling out. Under gravity, the straps 218 rest on the retaining ends 452. When removing the strap 218 located at the bottom of the strap holder 412 from the strap holder 412, the sloped inner surface 454 guides the strap 218 located at the bottom of the U-shaped body 450 towards the opening 458 for easy removal. When inserting the straps 218 into the strap holder 412, the sloped outer surface 455 guides the straps 218 into the opening 458.

Returning to FIGS. 4A-4B, in some embodiments, the cart 120 may include strap guides 414 for holding ends of straps above the upper arms 128 to prevent loose ends of the straps from interfering with movements of the pallet loads. In some embodiments, each of the lower arms 126 includes a recess 416 for holding the straps. In some embodiment, the strap guides 414 may be attached to the upper arms 128 at an angle for easy handling of the straps as shown in FIGS. 4A-4B. In other embodiments, the strap guides 414 may be flat against the upper arms 128. In other embodiments, the strap guides 414 may be omitted.

Figure 5B:
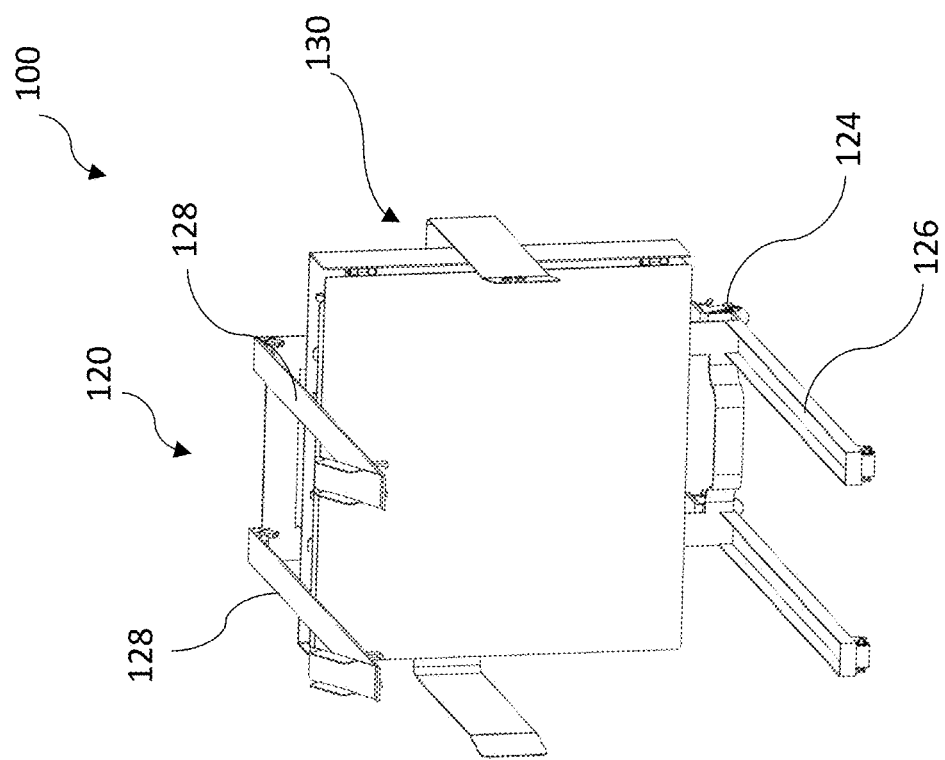
FIGS. 5A-5P are schematic perspective views of the cart and wrapping device holder assembly showing a method of applying wrapping device over pallet loads according to one embodiment of the present disclosure.
Figure 5A:
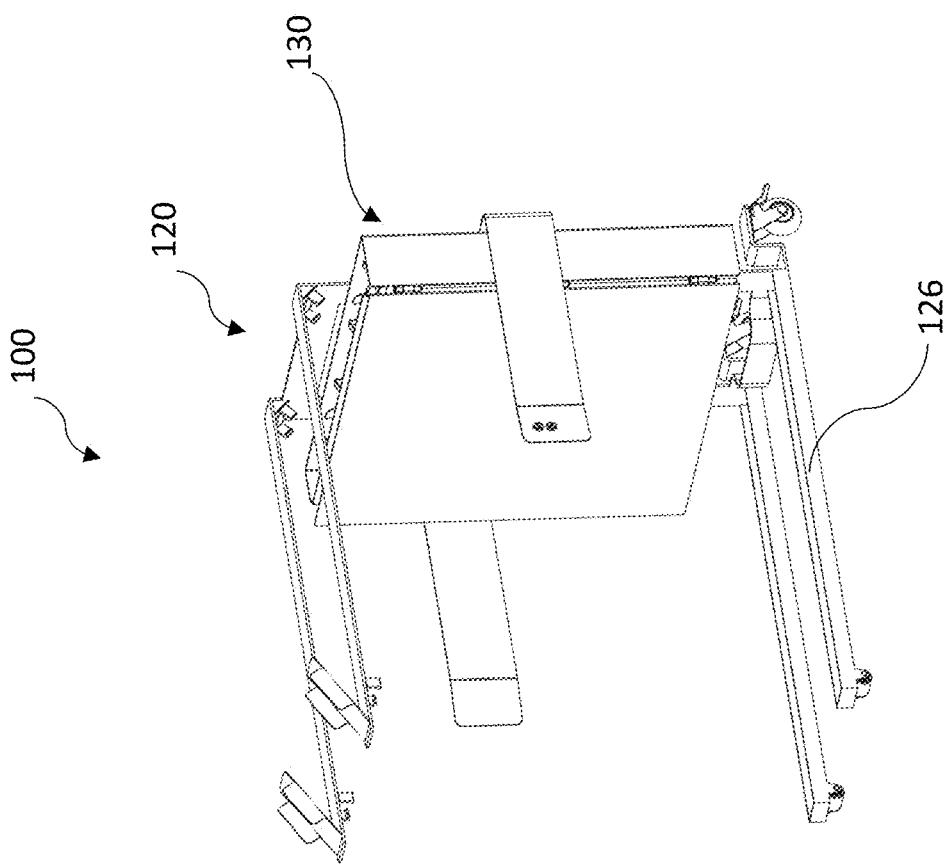
Figure 5D:
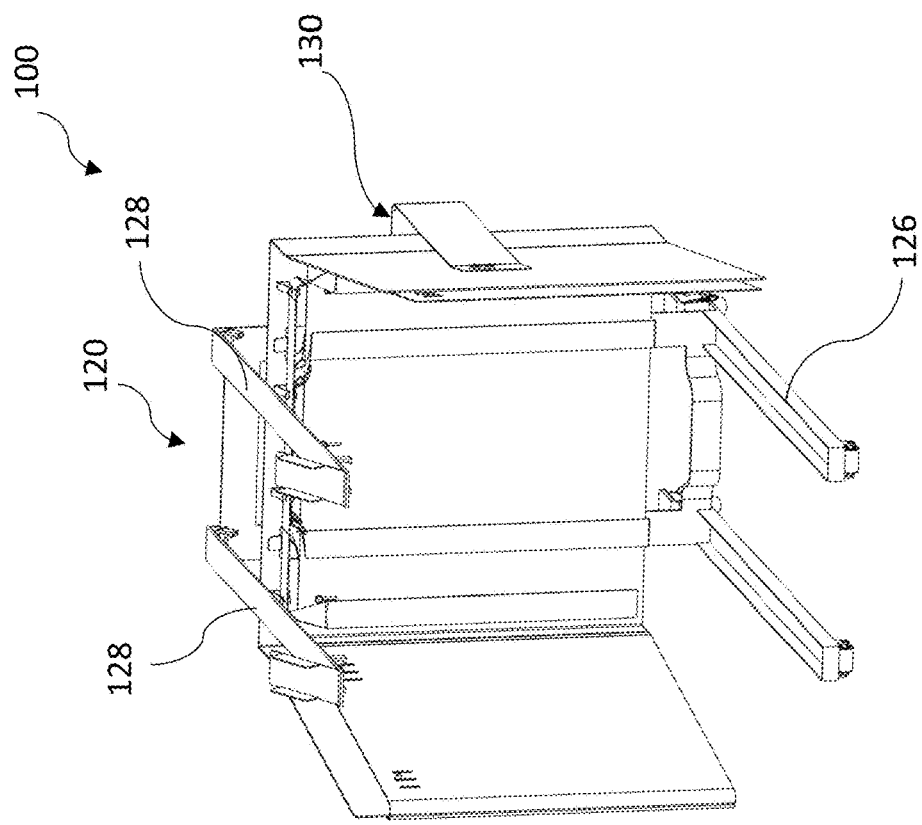
Figure 5C:
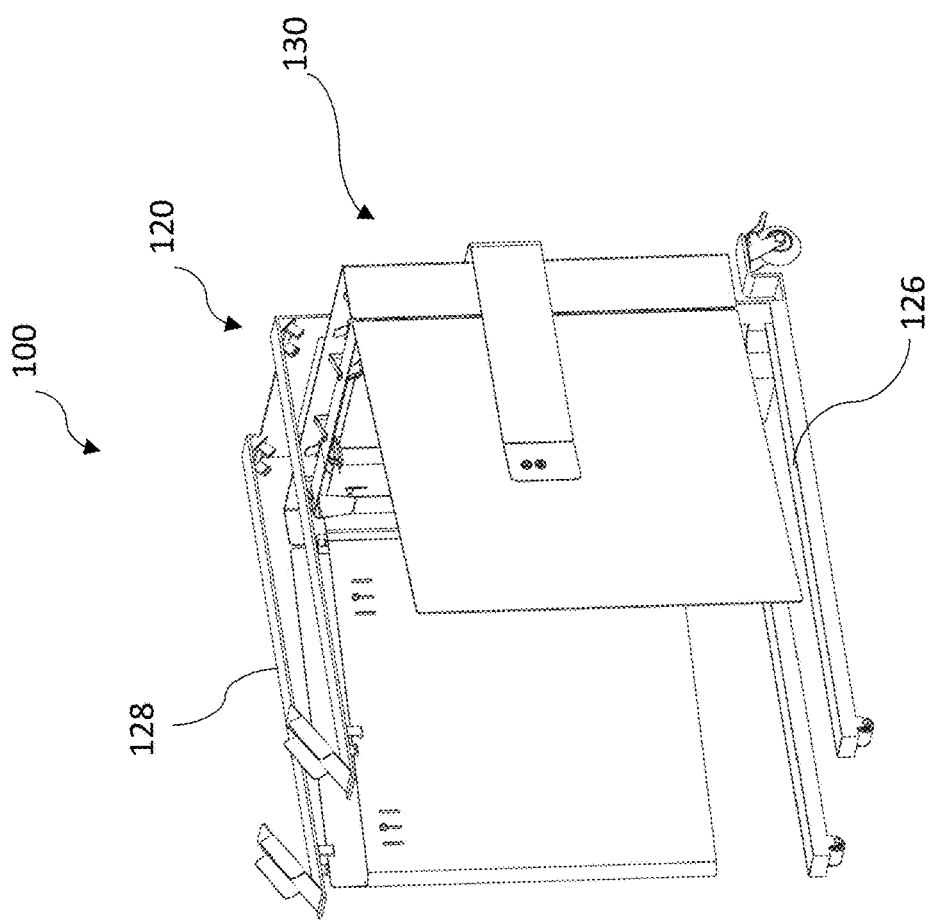
Figure 5F:
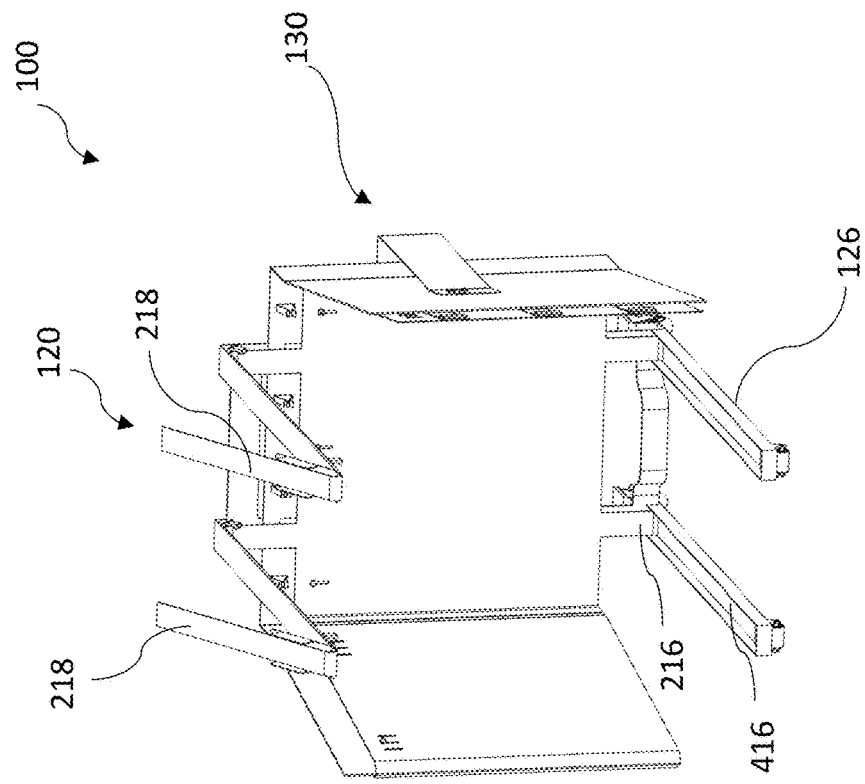
Figure 5E:
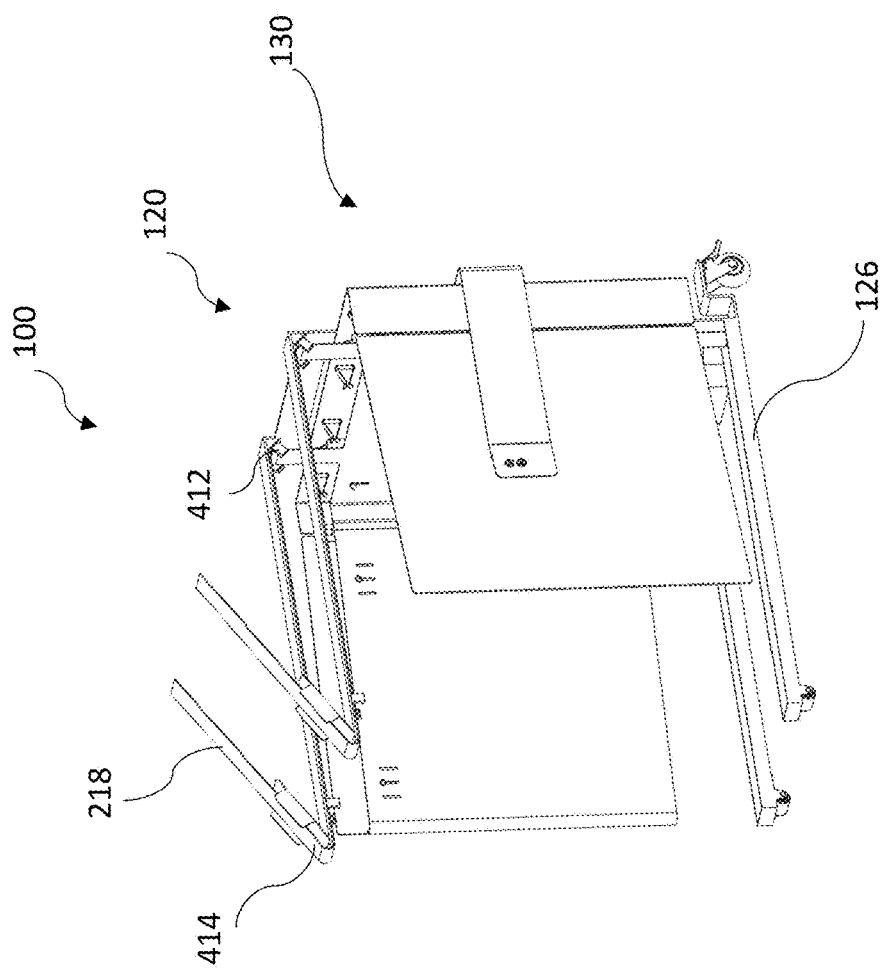
Figure 5H:
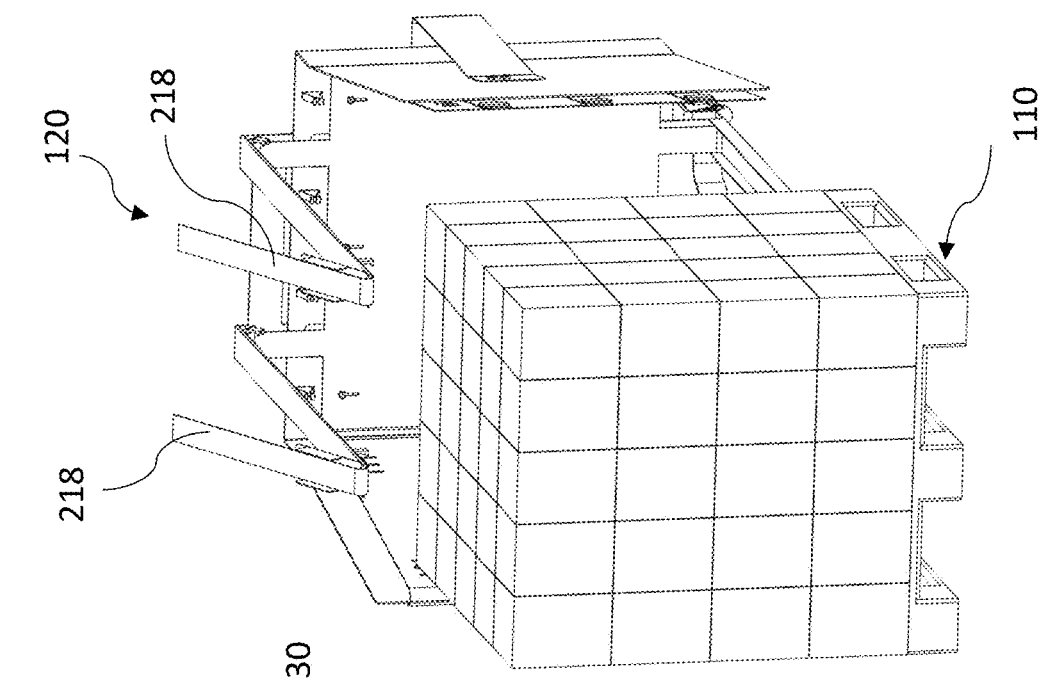
Figure 5G:
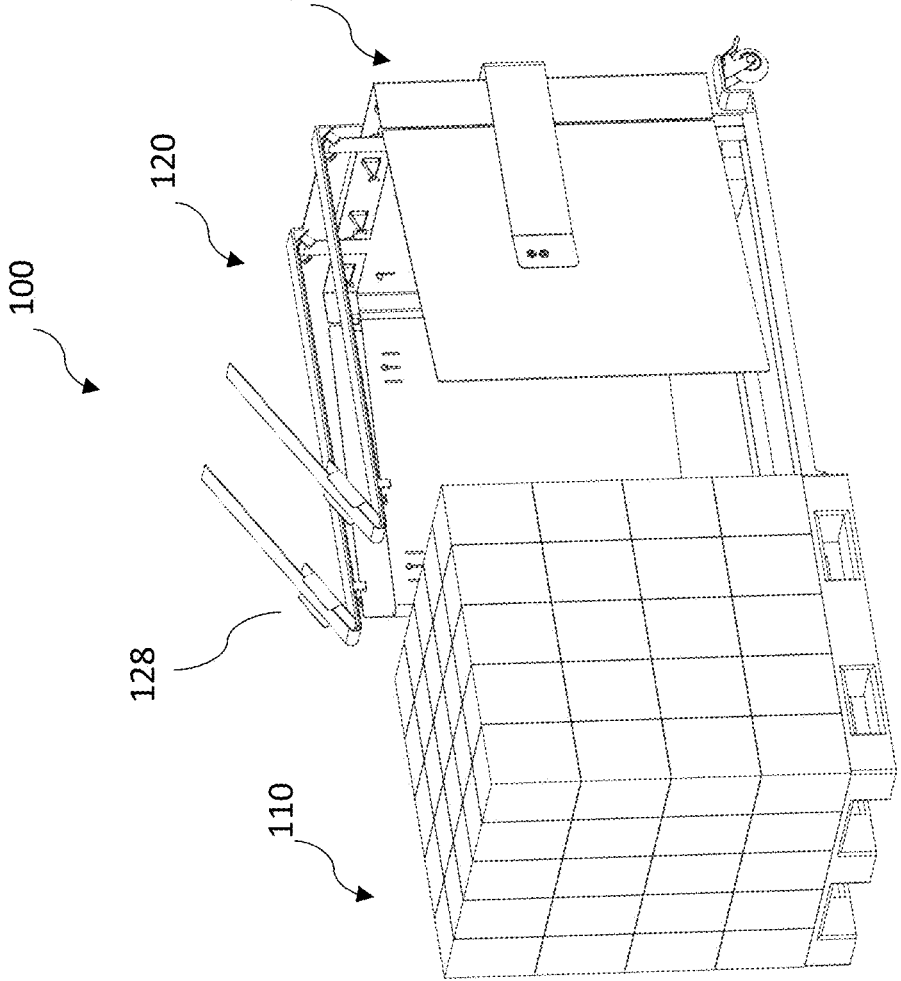
Figure 5J:
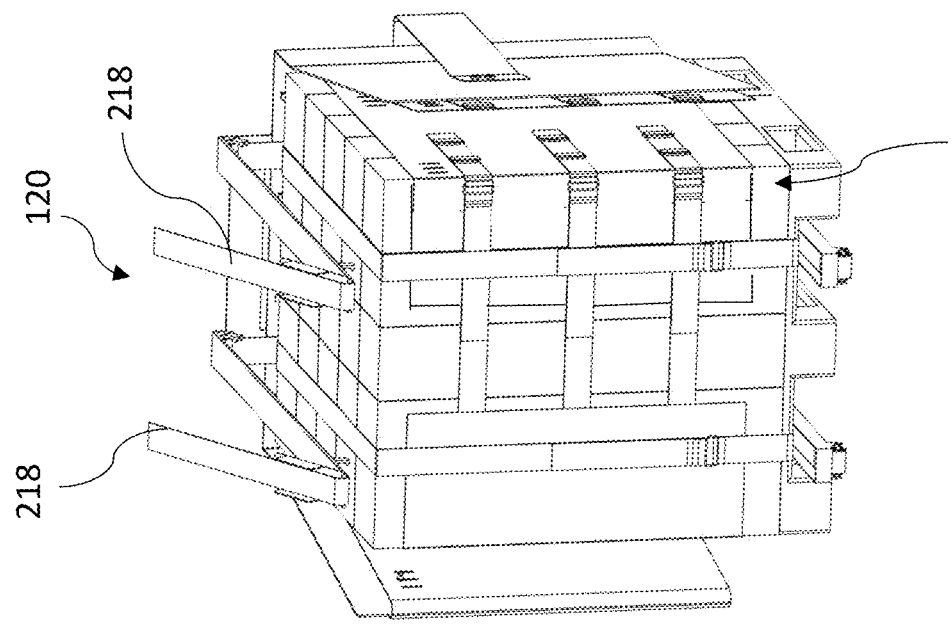
Figure 5I:
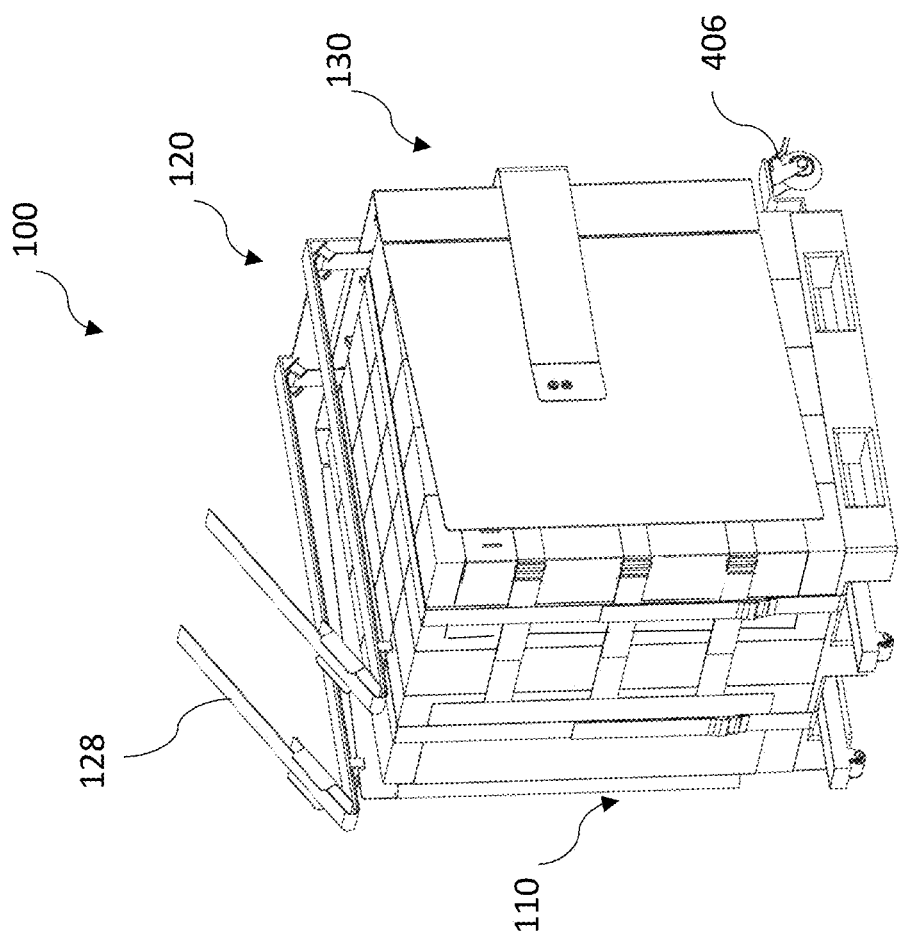
Figure 5L:
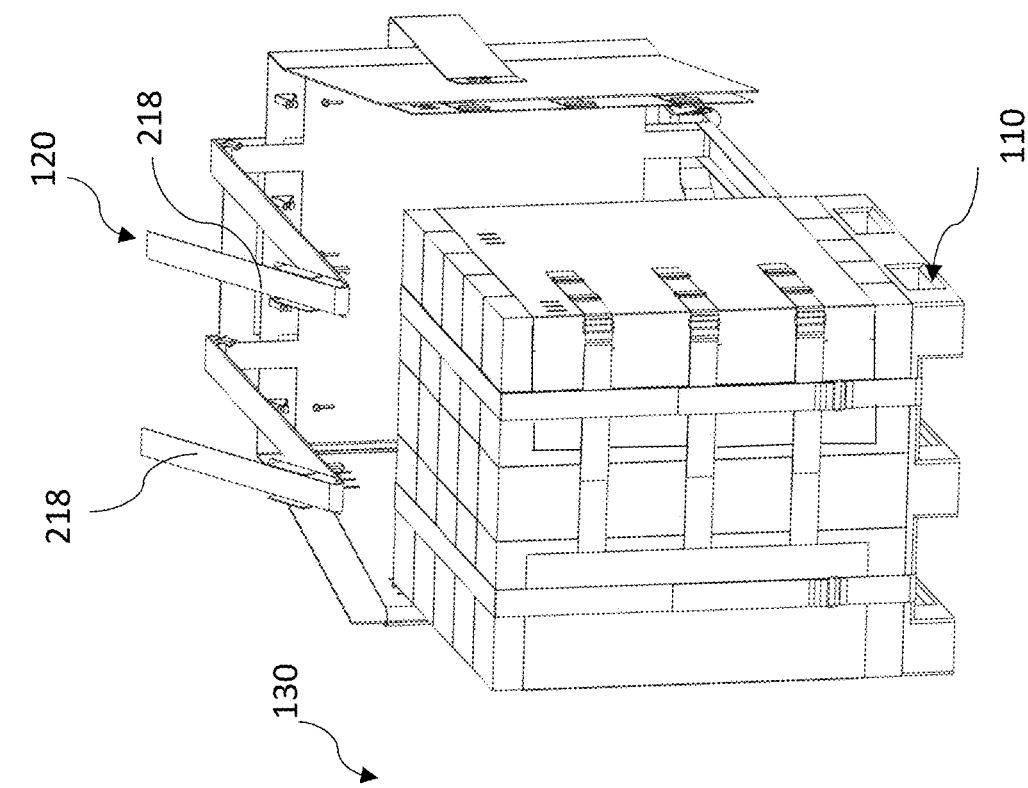
Figure 5K:
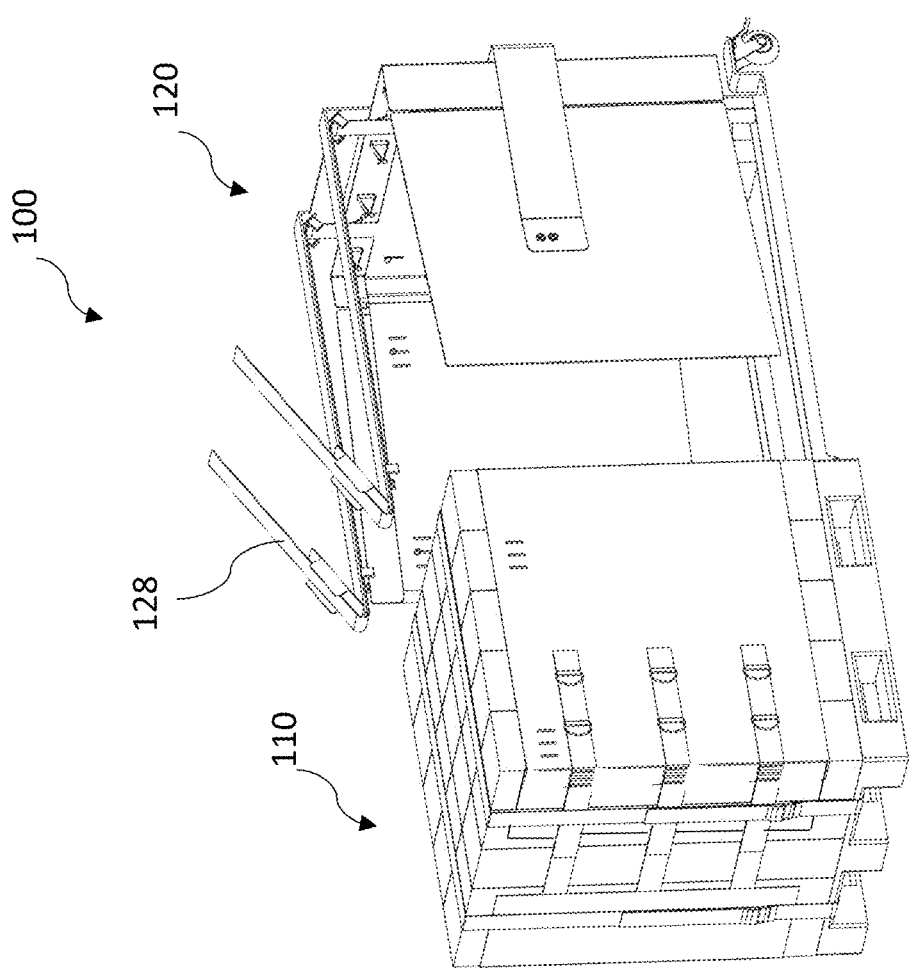
Figure 5N:
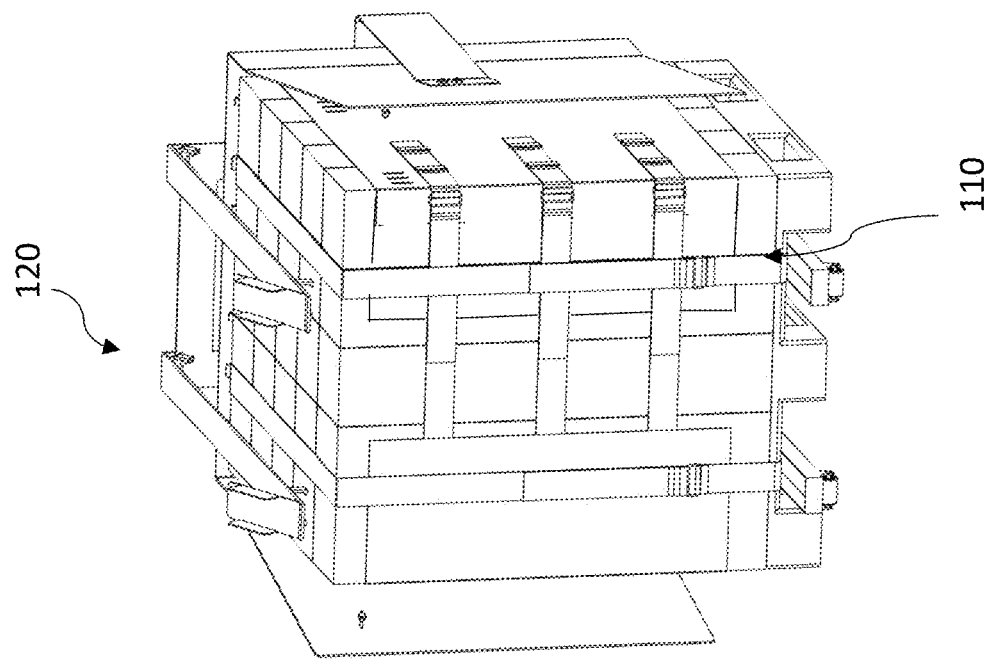
Figure 5M:
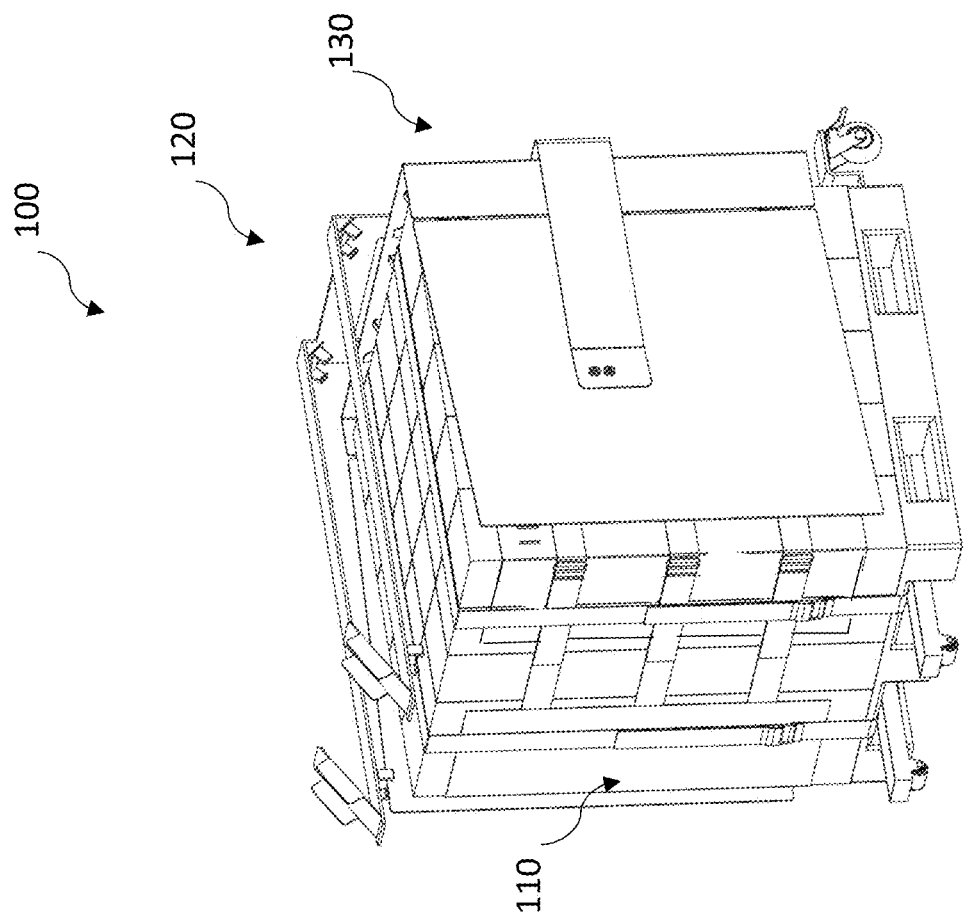
Figure 5P:
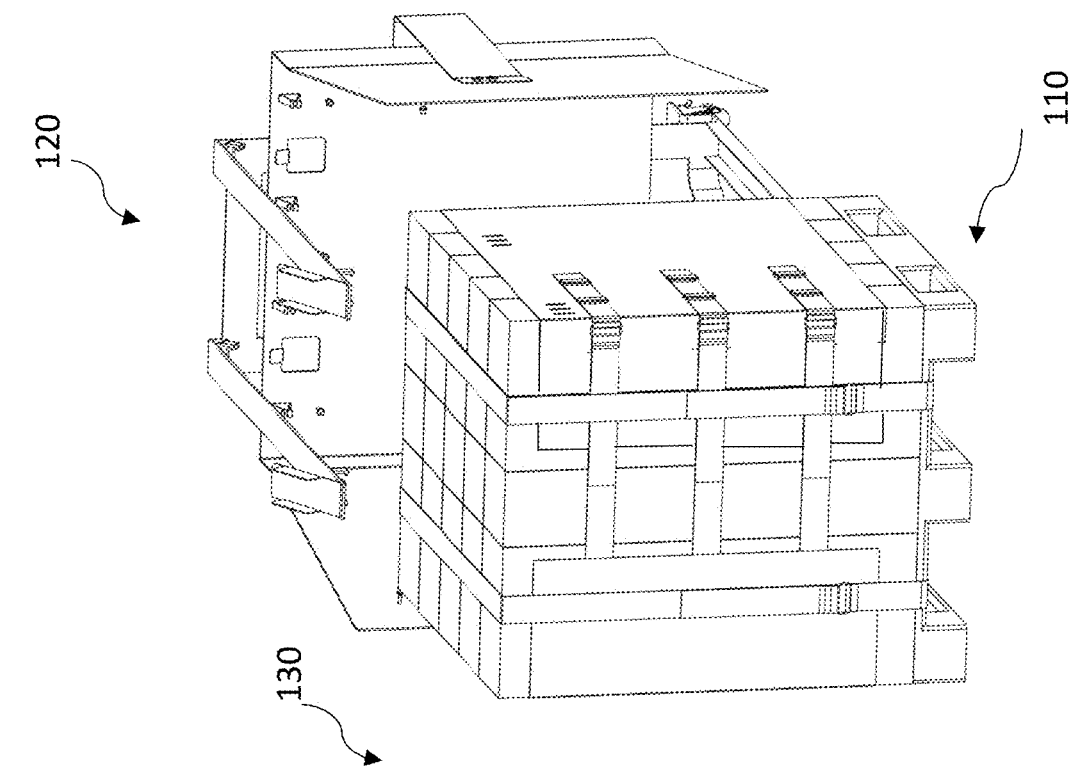
Figure 5O:
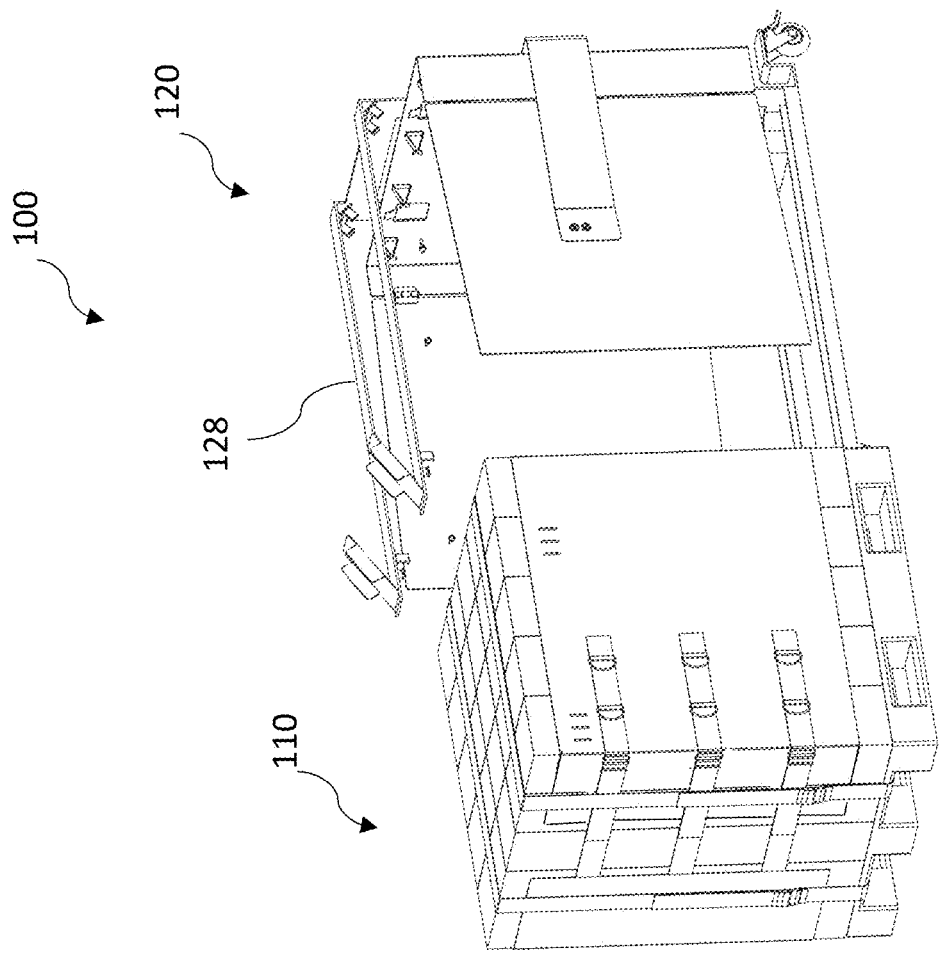
Figure 6:
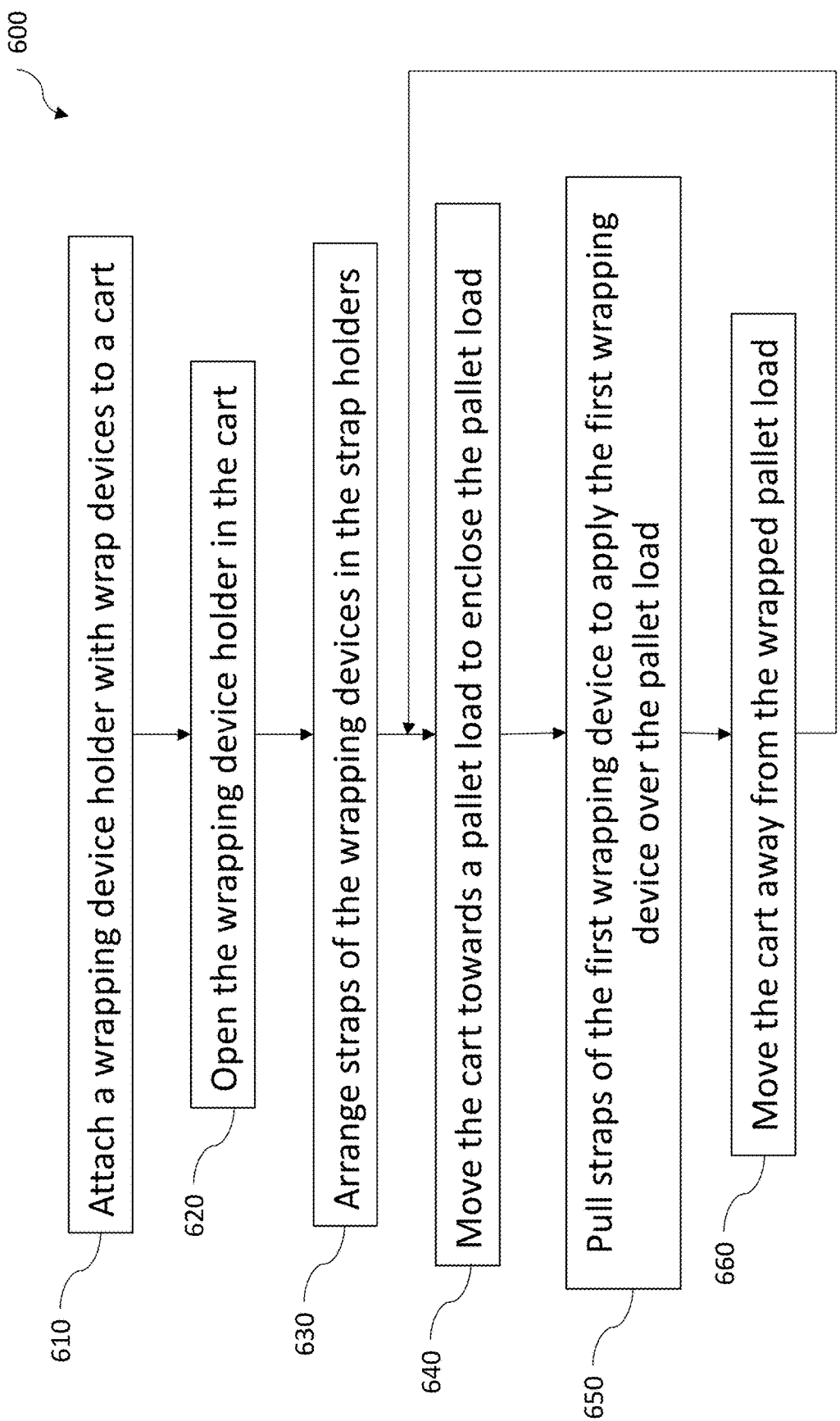
FIG. 6 is a flow chart of a method of applying wrapping device over pallet loads according to one embodiment of the present disclosure.

FIGS. 5A-5P are schematic perspective views of the cart and wrapping device holder assembly showing a method 600 of applying wrapping device over pallet loads according to one embodiment of the present disclosure. FIG. 6 is a flow chart of the method 600.

In operation 610, as shown in FIGS. 5A and 5B, a wrapping device holder 130 with a plurality wrapping devices 140 therein is attached to the cart 120.

In operation 620, as shown in FIGS. 5C-5D, the wrapping device holder 130 is opened up to expose the wrapping devices 140 therein.

In operation 630, as shown in FIGS. 5E-5F, straps of the wrapping devices 140 are pulled from the clips 324 of the wrapping device holder 130 and arranged in the cart 120. Particularly, the upper straps 218 are inserted into the strap holders 412 and strap guides 414. The lower straps 216 are arranged into the recess 416 in the lower arms 126.

In operation 640, as shown in FIGS. 5G-5H, the cart 120 is moved to towards the pallet load 110 to be wrapped. The lower arms 126 are aligned with the openings 108 of the pallet block 102 and inserted therein.

In operation 650, as shown in FIGS. 5I-5J, the pallet load 110 is wrapped with the first wrapping device 140 in the cart 120. When the cart 120 is moved to position, the break 406 may be applied to keep the cart 120 in position. The horizontal straps 210 of the first wrapping device 140 may be pulled from the wrapping device holder 130 to secure to the horizontal buckle groups 212. The upper straps 218 and the lower straps 216 of the first wrapping device 140 may be pulled from the strap holder 412 and the recess 416 to fasten with each other.

In operation 660, as shown in FIGS. 5K-5L, the cart 120 is moved to away from the wrapped pallet load 110.

Operations 640, 650, 660 may be repeated to wrap multiple pallet loads until all the wrapping devices 140 are used. FIGS. 5M-5N show that the last wrapping device 140 in the wrapping device holder 130 is used. After the wrapped pallet load is moved away from the cart 120 without any wrapping devices 140 as shown FIGS. 5O-5P, the empty wrapping device holder 130 may be removed from the cart 120, a new wrapping device holder 130 with wrapping devices 140 may be attached to the cart 120 to repeat the method 600.

FIGS. 7A-7B are schematic plan views of a wrapping device 740 according to the present disclosure. FIGS. 7C-7D are schematic perspective views of a pallet load secured with the wrapping device 740 of FIGS. 7A-7B. The wrapping device 740 is similar to the wrapping device 140 except that the wrapping device 740 does not include the upper straps 218. The wrapping device 740 includes lower straps 716 configured to fasten with fasten devices 718 attached to wrap body 202. The wrapping device 740 reduces straps thus simplifies applying and storing operations.

Figure 8B:
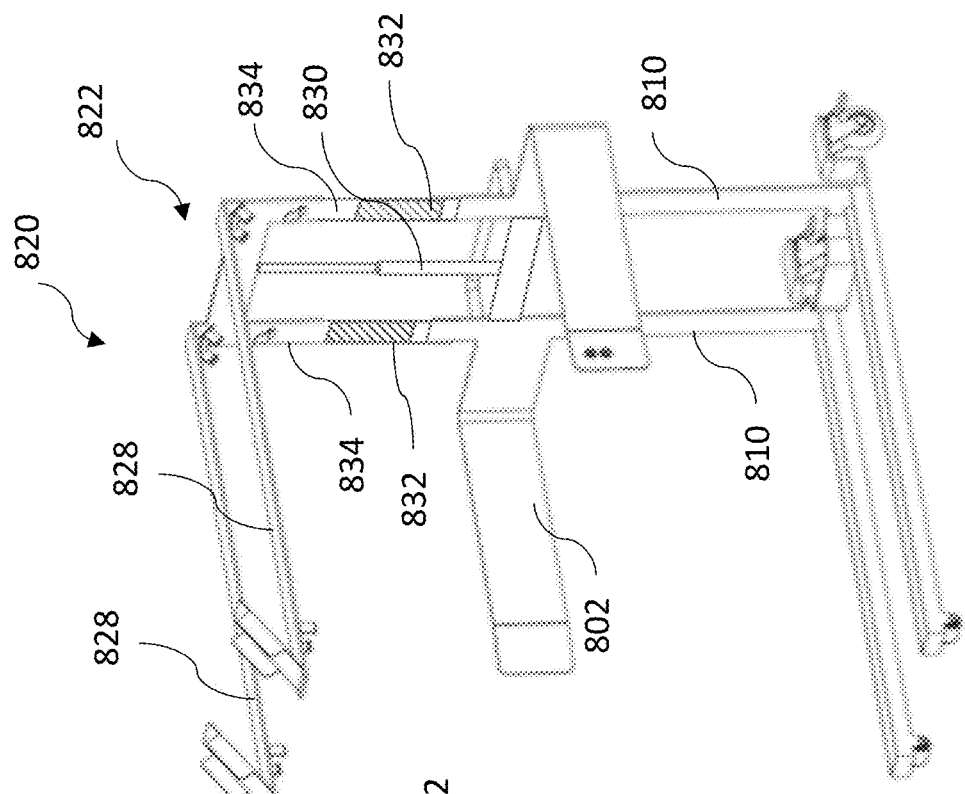
FIGS. 8A-8B are schematic perspective views of a cart for applying a wrapping device over pallet loads according to another embodiment of the present disclosure.
Figure 8A:
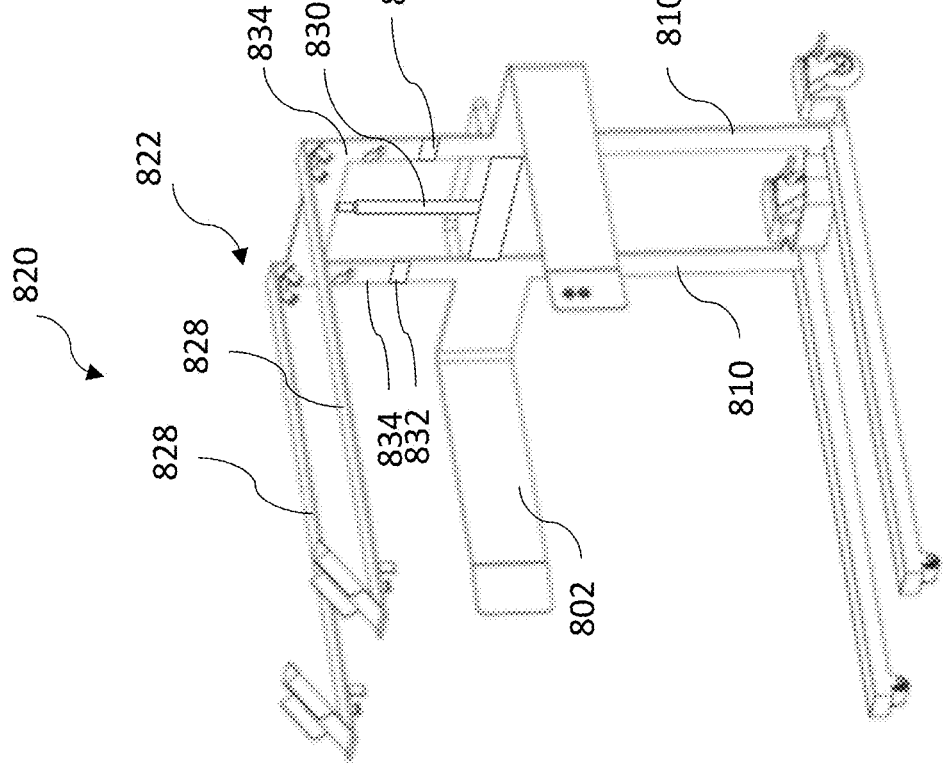

FIGS. 8A-8B are schematic perspective views of a cart 820 for applying a wrapping device over pallet loads according to another embodiment of the present disclosure. The cart 820 is configured to use with the wrapping device holder 130, 130a for applying a wrapping device over pallet loads. The cart 820 is similar to the cart 120 except that the cart 820 includes a height adjustment mechanism.

The cart 820 includes a frame 822 for receiving the wrapping device holder 130, 130a. In some embodiments, the frame 822 includes lower columns 810 and upper columns 834. Each lower column 810 is movably connected to the corresponding upper column 834. In some embodiments, an extendable section 832, such as a Z-frame, connects between the upper column 834 and the lower column 810. In other embodiments, the lower and upper columns 834, 810 are overlapping tubulars. The lower arms 126 extend from lower ends of the lower columns 810. Upper arms 828 extend from upper ends of the upper columns 834. Side arms 802 may extend from a section of the lower columns 810. Alternatively, the side arms 802 may extend from the upper column 834.

The cart 820 includes a lifting device 830 configured to raise and lower the upper arm 828 and the upper columns 834 relative to the lower columns 810. The lifting device 830 may be any suitable mechanism suitable for vertical motions, such as a hydraulic piston, a gear and rack pair, and a gear worm pair.

The lifting device 830 allows the cart 820 to adjust to pallets of various heights. FIG. 8A shows the cart 820 at a lowered position. FIG. 8B shows the cart 820 at a raised position. The lowered position may be used for handling short pallets or for easy installation and removal of the wrapping device holders. The raised position may be used for handling tall pallets.

Embodiments of the present disclosure provide an apparatus for applying reusable wrapping devices. The apparatus comprises a cart including two lower arms for inserting to openings of a pallet block, and adaptors for hanging a reusable wrapping device on the cart.

In one or more embodiments, the cart further includes wheels for moving the cart.

In one or more embodiments, the cart further includes one or more vertical columns, wherein the lower arms are attached to a lower end of the column, and upper arms attached to an upper end of the column.

In one or more embodiments, the cart further includes strap guides attached to the upper arms, wherein the strap guides are configured to receive straps from wrapping devices on the cart.

In one or more embodiments, each of the lower arms includes a recess for receiving straps from wrapping devices on the cart.

In one or more embodiments, the apparatus further comprises a break configured to park the cart.

In one or more embodiments, the cart further includes two side arms extending from the vertical columns.

In one or more embodiments, the adaptors are configured to receive a wrapping device holder configured to hold a plurality of wrapping devices therein.

Some embodiments of the present disclosure provide a wrapping device holder comprising a first panel having a first end and a second end, a second panel foldably attached to the first end of the first panel, a third panel foldably attached to the second end of the first panel, and a plurality of pegs positioned on the first, second, and third panels for hanging a wrap body of a wrapping devices.

In one or more embodiments, the wrapping device holder further comprises hinges for connecting the first and third panel, and the second and third panel.

In one or more embodiments, the wrapping device holder further comprises one or more clips configured to secure straps in the wrapping devices.

In one or more embodiments, the first panel has a U-shape.

In one or more embodiments, the first panel includes an adaptor for attaching the wrapping device holder to a cart.

In one or more embodiments, the wrapping device holder further comprises a first fasten device for securing the second panel to the first panel, and a second fasten device for securing the third panel to the first panel.

Some embodiments of the present disclosure provide a method for applying a reusable wrapping device. The method comprises hanging a wrapping device on a cart, wherein the cart includes two lower arms adapted to enter openings in a pallet block, moving the cart relative to a pallet load to insert lower arms of the cart into openings a pallet block of the pallet load, and pulling straps of the wrapping device on the cart to apply the wrapping device on the pallet load.

In one or more embodiments, hanging a wrapping device on a cart comprises attaching a wrapping device holder having a plurality of wrapping devices to the cart.

In one or more embodiments, hanging a wrapping device on the cart further comprising arranging straps of the plurality of wrapping devices on the lower arms of the cart.

In one or more embodiments, the cart further comprises two upper arms, and hanging a wrapping device further comprises arranging straps of the plurality of wrapping devices on strap guides.

In one or more embodiments, the method further comprises upon applying the wrapping device on the pallet load, moving the cart away from the wrapped pallet load, moving the cart towards a second pallet load to wrapped, and applying a second wrapping device in the wrapping device holder to the second pallet load.

In one or more embodiments, the method further comprises, after attaching the wrapping device holder to the cart, opening the wrapping device holder so that the wrapping devices encloses an inner volume for receiving pallet loads therein.

While the foregoing is directed to implementations of the present disclosure, other and further implementation of the disclosure may be devised without departing from the basic scope thereof, and the scope thereof is determined by the claims that follow.

The invention claimed is:

1. An apparatus for applying reusable wrapping devices, comprising:
   a cart comprising:
      a vertical column;
      two lower arms extending from the vertical column, wherein the two lower arms are arranged for inserting to openings of a pallet block; and
      adaptors for hanging a reusable wrapping device on the cart, wherein the reusable wrapping device comprises:
         a wrap body;
         one or more horizontal straps extending from a first side of the wrap body;
         one or more horizontal buckles attached to a second side of the wrap body and configured to fasten with the one or more horizontal straps;
         two upper straps extending from an upper side of the wrap body; and
         two lower straps extending from a lower side of the wrap body,
   wherein each of the lower arms of the cart includes a recess for receiving one of the lower straps from the reusable wrapping device.

2. The apparatus of claim 1, wherein the cart further includes wheels for moving the cart.

3. The apparatus of claim 2, further comprising a break configured to park the cart.

4. The apparatus of claim 2, wherein the cart comprises two front wheels attached to distal ends of the lower arms, and two back wheels positioned near the vertical column, and the front wheels are smaller than the back wheels.

5. The apparatus of claim 1, wherein the cart further comprises:
   two upper arms attached to an upper end of the vertical column.

6. The apparatus of claim 5, wherein the cart further comprises strap guides attached to the two upper arms, and the strap guides are configured to receive the upper straps of the reusable wrapping device.

7. The apparatus of claim 5, wherein the cart further comprises two side arms extending from the vertical column.

8. The apparatus of claim 5, wherein each of the upper arms comprises:

an arm body having a first end extending from the vertical column and a distal end away from the vertical column; and a first strap holder attached to the arm body to receive one of the upper strap of the reusable wrap device.

9. The apparatus of claim 8, wherein each of the upper arms further comprises:

a second strap holder attached to the arm body to receive one of the upper strap of the reusable wrap device, wherein the first strap is positioned near the distal end of the arm body, and the second strap holder is positioned near the first end of the arm body.

10. The apparatus of claim 8, wherein each of the upper arms further comprises:

a strap guide attached to the distal end of the arm body, wherein the strap guide is attached to an upper surface of the arm body, and the first strap holder is attached to a lower side of the arm body.

11. The apparatus of claim 10, wherein the strap guide is attached to the arm body at a tilted angle.

12. The apparatus of claim 1, further comprising a wrapping device holder configured to hold a plurality of the reusable wrapping devices therein, wherein the wrapping device holder is attached to adaptors of the cart.

13. The apparatus of claim 12, wherein the wrapping device holder comprises:

a first panel having a first end and a second end;

a second panel foldably attached to the first end of the first panel;

a third panel foldably attached to the second end of the first panel; and a plurality of pegs positioned on the first, second, and third panels for hanging the wrap body of the reusable wrapping device.

14. The apparatus of claim 13, further comprising hinges for connecting the first panel and third panel, and the second panel and first panel.

15. The apparatus of claim 13, further comprising one or more clips configured to secure the upper straps, lower straps, and horizontal straps of the reusable wrapping devices.

16. The apparatus of claim 1, wherein the adapters comprise a plurality of pegs corresponding to slits formed through the wrap body of the of reusable wrapping device.

17. The apparatus of claim 1, wherein the adapters comprise hooks.

18. The apparatus of claim 1, wherein the vertical column comprises a frame having two vertical bars and two horizontal bars.

* * * * *